US012798005B2

(12) United States Patent
Schmit et al.

(10) Patent No.: US 12,798,005 B2
(45) Date of Patent: Nov. 17, 2026

(54) METHOD FOR PRODUCING A WELDED STEEL BLANK AND ASSOCIATED WELDED STEEL BLANK

(71) Applicant: ArcelorMittal, Luxembourg (LU)

(72) Inventors: Francis Schmit, Bouvancourt (FR); Maria Poirier, Villers-Saint-Paul (FR); Cristian Alvarez, Montataire (FR); Lucille Gouton, Arsac (FR); Thierry David, Clermont (FR); Ivan Viaux, Paris (FR)

(73) Assignee: ArcelorMittal, Luxembourg (LU)

( * ) Notice: Subject to any disclaimer, the term of this patent is extended or adjusted under 35 U.S.C. 154(b) by 439 days.

(21) Appl. No.: 17/417,265

(22) PCT Filed: Dec. 24, 2019

(86) PCT No.: PCT/IB2019/061344
§ 371 (c)(1),
(2) Date: Jun. 22, 2021

(87) PCT Pub. No.: WO2020/136585
PCT Pub. Date: Jul. 2, 2020

(65) Prior Publication Data

US 2022/0072658 A1 Mar. 10, 2022

(30) Foreign Application Priority Data

Dec. 24, 2018 (WO) .................. PCT/IB2018/060585

(51) Int. Cl.
*B23K 26/26* (2014.01)
*B23K 26/12* (2014.01)
(Continued)

(52) U.S. Cl.
CPC ............ *B23K 26/26* (2013.01); *B23K 26/123* (2013.01); *B23K 26/322* (2013.01); *B23K 26/36* (2013.01);
(Continued)

(58) Field of Classification Search
CPC .. B23K 26/26; B23K 26/322; B23K 2101/34; B23K 2103/04; B23K 33/00;
(Continued)

(56) References Cited

U.S. PATENT DOCUMENTS 4,517,441 A 5/1985 Kaljee et al.
9,616,513 B2 4/2017 Garcia et al.
(Continued)

FOREIGN PATENT DOCUMENTS

CN 101100021 A 9/2008
CN 106334875 1/2017
(Continued)

OTHER PUBLICATIONS

Search Report for PCT/IB2019/061344.
(Continued)

*Primary Examiner* — Erwin J Wunderlich
(74) *Attorney, Agent, or Firm* — Davidson Kappel LLC

(57) ABSTRACT

A method for producing a welded steel blank (1) includes providing two precoated sheets (2), each comprising a steel substrate (3) having a precoating (5) on each of its two main faces (4), each sheet (2) comprising, on each main face (4), at a weld edge (14), a removal zone (18) in which the precoating (5) is removed over a removal fraction; and butt welding the sheets (2) using a filler wire (20) so as to create a weld joint (22) having an aluminum content $Al_{WJ}$ comprised between 0.1 wt. % and 1.2 wt. %. The composition of the wire (20) and the proportion of wire (20) added is such that the weld joint (22) has: (a) a quenching factor $FT_{WJ}$ such
(Continued)

that $FT_{WJ}-0.96FT_{BM}\geq 0$, (b) a nickel content $Ni_{WJ}\leq 14-3.4\times Al_{WJ}$ and a chromium content $Cr_{WJ}\leq 5-2\times Al_{WJ}$, where $Al_{WJ}$ is the aluminum content of the weld joint (22).

48 Claims, 3 Drawing Sheets

(51) Int. Cl.

| | |
|---|---|
| ***B23K 26/322*** | (2014.01) |
| ***B23K 26/36*** | (2014.01) |
| ***B23K 26/361*** | (2014.01) |
| ***B23K 26/60*** | (2014.01) |
| ***B23K 33/00*** | (2006.01) |
| ***C22C 38/06*** | (2006.01) |
| ***F16B 5/08*** | (2006.01) |
| *B23K 101/18* | (2006.01) |
| *B23K 101/34* | (2006.01) |
| *B23K 103/04* | (2006.01) |
| *B23K 103/10* | (2006.01) |

(52) U.S. Cl.

CPC .............. *B23K 26/60* (2015.10); *B23K 33/00* (2013.01); *B23K 26/361* (2015.10); *B23K 33/008* (2013.01); *B23K 2101/18* (2018.08); *B23K 2101/185* (2018.08); *B23K 2101/34* (2018.08); *B23K 2103/04* (2018.08); *B23K 2103/10* (2018.08); *C22C 38/06* (2013.01); *F16B 5/08* (2013.01)

(58) Field of Classification Search

CPC .............. B23K 26/361; B23K 2103/10; B23K 2101/185; B23K 2101/18; B23K 33/008; B23K 26/123; B23K 26/36; B23K 26/60; C22C 38/06; F16B 5/08

USPC ...................... 219/121.63; 148/529; 428/680

See application file for complete search history.

(56) References Cited

U.S. PATENT DOCUMENTS

| | | | | |
|---|---|---|---|---|
| 9,901,969 | B2 * | 2/2018 | Miyazaki | B21D 22/022 |
| 10,889,884 | B2 | 1/2021 | Allely et al. | |
| 11,014,195 | B2 * | 5/2021 | Pan | C22C 38/32 |
| 11,945,503 | B2 * | 4/2024 | Alvarez | B21D 22/022 |
| 2009/0220815 | A1 * | 9/2009 | Canourgues | C21D 9/50 428/653 |
| 2012/0074106 | A1 * | 3/2012 | Canourgues | B23K 26/32 219/137 R |
| 2013/0078031 | A1 * | 3/2013 | Nakamura | C22C 38/02 403/272 |
| 2014/0003860 | A1 | 1/2014 | Evangelista et al. | |
| 2015/0043962 | A1 | 2/2015 | Miyazaki et al. | |
| 2015/0306702 | A1 | 10/2015 | Breuer et al. | |
| 2016/0144456 | A1 | 5/2016 | Kim | |
| 2016/0332256 | A1 | 11/2016 | Gu et al. | |
| 2016/0368809 | A1 | 12/2016 | Breuer et al. | |
| 2017/0016086 | A1 * | 1/2017 | Sanadres | C23C 2/28 |
| 2017/0080523 | A1 | 3/2017 | Andersson | |
| 2017/0095886 | A1 | 4/2017 | Gu et al. | |
| 2017/0120391 | A1 * | 5/2017 | Schmit | B23K 26/40 |
| 2017/0304952 | A1 * | 10/2017 | Cretteur | C21D 9/48 |
| 2017/0341187 | A1 | 11/2017 | Cretteur et al. | |
| 2017/0350434 | A1 * | 12/2017 | Maruyama | B21D 53/88 |
| 2018/0326538 | A1 | 11/2018 | Breuer et al. | |
| 2019/0285103 | A1 | 9/2019 | Canourgues et al. | |
| 2020/0038998 | A1 | 2/2020 | Pan et al. | |
| 2020/0271247 | A1 † | 8/2020 | Fujimoto et al. | |
| 2020/0353983 | A1 * | 11/2020 | Alvarez | B23K 26/211 |
| 2021/0162550 | A1 | 6/2021 | Schmit et al. | |
| 2021/0222804 | A1 * | 7/2021 | Fujimoto | B23K 31/02 |

FOREIGN PATENT DOCUMENTS

| | | | |
|---|---|---|---|
| CN | 106687248 | A | 5/2017 |
| CN | 106488824 | B | 11/2019 |
| DE | 102015115915 | A1 | 3/2017 |
| EP | 2007545 | A1 | 12/2008 |
| EP | 2737971 | A1 | 6/2014 |
| EP | 2832887 | † | 2/2015 |
| EP | 2 942 143 | A1 | 11/2015 |
| EP | 3812083 | A1 | 4/2021 |
| JP | S59101298 | A | 6/1984 |
| JP | 2003145286 | A | 5/2003 |
| JP | 2006021216 | | 1/2006 |
| JP | 2014529007 | A | 10/2014 |
| JP | 2017512137 | A | 5/2017 |
| JP | 2017514694 | A | 6/2017 |
| JP | 2018528324 | | 9/2018 |
| KR | 20160033541 | A | 3/2016 |
| KR | 20180033593 | A | 4/2018 |
| WO | 2013147035 | † | 10/2013 |
| WO | WO2013147035 | A1 | 10/2013 |
| WO | WO 2014075824 | A1 | 5/2014 |
| WO | 2014085818 | † | 6/2014 |
| WO | WO 2015/086781 | A1 | 6/2015 |
| WO | WO2015150892 | A1 | 10/2015 |
| WO | WO2016080488 | A1 | 5/2016 |
| WO | 2017006159 | † | 1/2017 |
| WO | 2017017513 | † | 2/2017 |
| WO | 2019093440 | † | 5/2019 |
| WO | 2019102424 | † | 5/2019 |
| WO | WO2019093440 | A1 | 5/2019 |

OTHER PUBLICATIONS

Search Report for PCT/IB2018/060585.

Wenhu etal: Effect of Filler Wire on Laser Welded Blanks of Al—Si—Coated 22MnB5 Steel, Sep. 20, 2018, URL: https://www.sciencedirect.com/science/article/pii/S0924013618301882, pp. 1-4, pp. 14-16.

Third Party Observations for application No. EP20190835826.

Tadashi Kasuya, Flux Cored Wire for Fatigue Strength Improvement, SX-1LD, Journal of the Japan Welding Society, vol. 78 (2009), No. 4, pp. 244-247 (https://www.jstage.jst.go.jp/article/jjws/78/4/78_244/_pdf/-char/ja).†

* cited by examiner
† cited by third party

METHOD FOR PRODUCING A WELDED STEEL BLANK AND ASSOCIATED WELDED STEEL BLANK

The present disclosure relates to a method for producing a welded steel blank, to the thus obtained welded steel blank, to a method for producing a welded, hot press-formed and cooled steel part from the welded steel blank and to the thus obtained welded, hot press-formed and cooled steel part.

BACKGROUND

Methods for the fabrication of welded parts from steel sheets of different compositions and/or thicknesses that are butt-welded to one another are known from the prior art. More particularly, the welded blanks are usually heated to a temperature allowing the austenitization of the steel and are then hot-formed and cooled in the hot-press forming tool. The composition of the steel can be selected both to make subsequent heating and forming operations possible and to give the welded steel part high mechanical strength, high impact strength and good corrosion resistance.

Steel parts of this type are used in particular in the automobile industry, and more particularly for the fabrication of anti-intrusion parts, structural parts or parts that contribute to the safety of motor vehicles.

In order to prevent corrosion, the steel sheets are pre-coated with an aluminum-based precoating through hot-dip coating in an aluminum-containing bath. If the steel sheets are welded without any prior preparation, the aluminum-based precoating will be diluted with the steel substrate within the molten metal during the welding operation. In the range of aluminum contents of the precoating, two phenomena can then occur.

If the aluminum content in the molten metal is locally high, intermetallic compounds are formed in the weld joint, resulting from the dilution of a portion of the precoating in the molten metal and of the alloying which occurs during the subsequent heating of the weld joint before the hot forming step. These intermetallic compounds are sites where incipient cracking is most likely to occur.

Furthermore, the aluminum tends to increase the austenitization temperature (Ac3) of the weld joint, and this modification of the austenitic domain will be all the more important as the level of aluminum in the weld joint is high. In some cases, this may prevent the complete austenitization of the weld joint which should occur on heating prior to forming and is the first step required for hot stamping and obtaining a martensitic structure in the weld joint after hot-press forming and cooling.

Moreover, aluminum also has a detrimental effect on the quenchability of the weld joint, as it increases the critical cooling speed necessary to obtain martensitic or bainitic structures in the weld joint during cooling.

Consequently, it is no longer possible to obtain martensite or bainite during the cooling after the hot forming and the thus obtained weld joint will contain ferrite. The weld joint then exhibits a hardness and mechanical strength which are less than those of the two adjacent sheets and therefore constitutes the weakest area of the part.

Publication EP2007545 describes a solution which consists in removing the superficial layer of metallic alloy at the weld edge of the pre-coated steel sheets, which is intended to be incorporated at least partially into the weld metal zone. The removal can be performed by brushing or using a laser beam. The intermetallic alloy layer is preserved in order to guarantee the corrosion resistance and to prevent the phenomena of decarburization and oxidation during the heat treatment that precedes the forming operation. The effect of aluminum is, in this case, reduced by a local elimination of the superficial layer of the coating.

However, the inventors of the present patent application have observed that, even if the superficial layer of metallic alloy is removed at the weld edge of the pre-coated steel sheets, the weld joint may still have insufficient mechanical properties. Indeed, the aluminum concentration in the weld joint may still be too high, due to the presence of projections from the coating onto the side face of the steel sheet at the weld edge resulting from the removal operation and/or, for thin steel sheets having, for example, a thickness smaller than or equal to 1.0 mm.

EP 2 737 971, US 2016/0144456 and WO 2014075824 try to provide a method in which the precoated sheets are welded without prior removal of the precoating, using a filler wire comprising austenite-stabilizing elements, such as carbon, manganese or nickel, with the aim of obtaining a fully martensitic structure in the weld joint, after hot press-forming and cooling, despite the presence of aluminum in the weld resulting from the melting of the precoating.

These methods are, however, not entirely satisfactory since they only deal with one of the problems relating to the presence of aluminum in the weld pool: the compensation of the austenitization temperature (Ac3) and, in some cases, the use of high carbon filler wires can induce segregations in the weld joint. Indeed, the inventors of the present disclosure have found that the methods disclosed in the above-mentioned documents do not allow obtaining satisfactory mechanical properties in the parts obtained after hot press-forming and cooling, in particular for aluminum contents greater than or equal to 0.7% by weight in the weld joint. In particular, for such parts, there is a high risk of failure in the weld joint under tensile testing in the weld transverse direction.

The methods disclosed in WO 2015/086781 and EP 2 942 143 also deal with this issue and describe methods in which the precoated steel sheets are welded using particular welding methods with specific filler materials.

More particularly, WO 2015/086781 suggests using twin spot laser welding while supplying filler material in the form of a metal powder having the following composition, in weight percentage: C: 0-0.03 wt. %, Mo: 2.0-3.0 wt. %, Ni: 10-14 wt. %, Mn: 1.0-2.0 wt. %, Cr: 16-18 wt. % and Si: 0.0-1.0 wt. %, the rest being iron.

EP 2 942 143 suggests using hybrid laser/arc welding using an arc welding torch positioned in front of the laser beam, while supplying filler material in the form of a filler wire having the following composition: C: 0-0.3 wt. %, Mo: 0-0.4 wt. %, Ni: 6-20 wt. %, Mn: 0.5-7 wt. %, Cr: 5-22 wt. % and Si: 0-1.3 wt. %, Nb: 0-0.7 wt. %, the rest being iron.

These methods are also not satisfactory. Indeed, the inventors of the present disclosure have observed that the use of the filler wires described therein results in a high risk of failure of the part after hot press-forming and cooling in the zone immediately adjacent to the weld.

Furthermore, the use of hybrid laser-arc welding is not desirable, since hybrid laser/arc welding does not allow reaching the same welding speeds as laser welding and therefore results in a decreased overall productivity of the process.

Moreover, powder addition is generally more difficult to implement in a large-scale industrial setting than filler wires.

All of the methods based on filler material addition mentioned here-before only specify chemical composition ranges for the filler material, and, since the welding parameters and conditions have an influence on the filler material rate, one single filler wire can induce very different chemical compositions in the weld joint. The description of the composition of the filler wire alone therefore appears not to be sufficient to solve the aforementioned problems.

SUMMARY

An object of the present disclosure is therefore to provide a method for producing a welded steel blank from two such precoated sheets that allows obtaining, after hot press-forming and cooling, a part having satisfactory crash performance properties, even for relatively high aluminum contents in the weld joint.

For this purpose, it is in particular desirable to avoid fully brittle fracture in the weld joint.

For this purpose, a method for producing a welded steel blank is provided comprising the successive steps of:

- providing two precoated sheets, each precoated sheet comprising a steel substrate (3) having a precoating on each of its two main faces, the precoating comprising an intermetallic alloy layer comprising at least iron and aluminum and, optionally, a metallic alloy layer extending atop the intermetallic alloy layer, the metallic alloy layer being a layer of aluminum, a layer of aluminum alloy or a layer of aluminum-based alloy,
- each precoated sheet comprising, on each main face thereof, at a weld edge intended to be incorporated at least partially into the weld joint, a removal zone in which the precoating has been removed over a removal fraction comprised between 30% and 100% of the thickness of the precoating;
- butt welding the precoated sheets using a filler wire so as to create a weld joint at the junction between the precoated sheets, the weld joint having a mean aluminum content $Al_{WJ}$ comprised between 0.1 wt. % and 1.2 wt. %,
- wherein
- the composition of the filler wire and the proportion of filler wire added to the weld pool is chosen in such a manner that the thus obtained weld joint is characterized by:
- (a) a quenching factor $FT_{WJ}$ of the weld joint such that $FT_{WJ}-0.96FT_{BM}\geq 0$,
  - where:
    - $FT_{BM}$ is the quenching factor of the least hardenable steel substrate among the steel substrates of the two precoated sheets, and
    - the quenching factors $FT_{WJ}$ and $FT_{BM}$ are determined using the following formula: $FT=128+1553\times C+55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint in the case of $FT_{WJ}$ and the least hardenable substrate in the case of $FT_{BM}$,
- (b) a mean nickel content $Ni_{WJ}$ in the weld joint fulfilling the following relationship: $Ni_{WJ}\leq 14-3.4\times Al_{WJ}$, where $Al_{WJ}$ is the mean aluminum content in the weld joint; and
- (c) a mean chromium content $Cr_{WJ}$ in the weld joint fulfilling the following relationship: $Cr_{WJ}\leq 5-2\times Al_{WJ}$, where $Al_{WJ}$ is the mean aluminum content in the weld joint.

According to particular embodiments, the method may comprise one or more of the following features, taken alone or according to any technically possible combination:

- the steel of the substrate of at least one of the precoated sheets, and for example of each precoated sheet, comprises, by weight:
- $0.10\%\leq C\leq 0.5\%$
- $0.5\%\leq Mn\leq 4.5\%$
- $0.1\%\leq Si\leq 1\%$
- $0.01\%\leq Cr\leq 1\%$
- $Ti\leq 0.2\%$
- $Al\leq 0.1\%$
- $S\leq 0.05\%$
- $P<0.1\%$
- $B\leq 0.010\%$
- the rest being iron and impurities resulting from manufacturing;
- the substrate of each of the precoated sheets is made of a press-hardenable steel;
- the mean aluminum content of the weld joint is greater than or equal to 0.15 wt. %;
- the mean aluminum content of the weld joint is smaller than or equal 0.8 wt. %;
- the mean nickel content of the weld joint is comprised between 0.1 wt. % and 13.6 wt. %, and more particularly between 0.2 wt. % and 12.0 wt. %;
- the welded steel blank is such that, after hot press-forming and cooling, the Charpy energy of the weld joint at 20° C. is greater than or equal to 25 J/cm$^2$ and the ultimate tensile strength of the hot press-formed and cooled steel welded steel blank is greater than or equal to the ultimate tensile strength of the weakest substrate among the substrates of the precoated sheets, the weakest substrate being the substrate for which the product of the thickness by the ultimate tensile strength after hot press-forming and cooling is the lowest;
- the filler wire has a carbon content comprised between 0.01 wt. % and 0.45 wt. %;
- for at least one precoated sheet, and for example for both precoated sheets, the removal fraction is strictly smaller than 100% of the thickness of the precoating;
- for at least one precoated sheet, the precoating comprises a metallic alloy layer extending atop the intermetallic alloy layer, the metallic alloy layer being a layer of aluminum, a layer of aluminum alloy or a layer of aluminum-based alloy and, for at least one precoated sheet, and for example for both precoated sheets, the metallic alloy layer has been removed over its entire thickness, while the intermetallic alloy layer remains integral in the removal zone on each main face of the precoated sheet;
- for at least one precoated sheet provided at the provision step, and for example for both precoated sheets, in the removal zone on each main face of the precoated sheet, the removal fraction is equal to 100% such that the precoating has been removed over its entire thickness;
- the method further comprises, prior to the provision step, a step of producing the two precoated sheets from respective initial precoated sheets, this step comprising a sub-step of obtaining the removal zone on each main face of each precoated sheet through removal of the precoating over a fraction removal fraction comprised between 30% and 100% of the thickness of the precoating through laser ablation at the weld edge of the precoated sheet;
- the step of producing the two precoated sheets comprises:
  - providing two initial precoated sheets, arranging these two initial precoated sheets adjacent to each other while leaving a predetermined gap therebetween; and simultaneously removing, through laser ablation, the precoating on the two adjacent initial precoated sheets so as to simultaneously create the removal zone on adjacent faces of these two initial precoated sheets, the laser beam overlapping the two adjacent initial precoated sheets during the removal step, and, optionally, during the welding step, the thus prepared adjacent two precoated sheets are welded with the laser beam spot overlapping the two adjacent precoated sheets, the time between the end of the laser ablation and the beginning of the welding being preferably less than or equal to 10 seconds;

the method further comprises, prior to butt welding, preparing the weld edge of at least one of the precoated sheets, using at least one of the following processing steps: brushing, machining, chamfering and/or beveling;

the welding step is performed using a laser beam;

the two precoated sheets have the same thickness;

the two precoated sheets have different thicknesses;

for at least one of the precoated sheets, and for example for both precoated sheets, the steel of the substrate comprises, by weight:

0.15%≤C≤0.25%

0.8%≤Mn≤1.8%

0.1%≤Si≤0.35%

0.01%≤Cr≤0.5%

Ti≤0.1%

Al≤0.1%

S≤0.05%

P≤0.1%

B≤0.005% the rest being iron and impurities resulting from manufacturing;

for one of the precoated sheets, the steel of the substrate comprises, by weight:

0.040%≤C≤0.100%

0.80%≤Mn≤2.00%

Si≤0.30%

S≤0.005%

P≤0.030%

0.010%≤Al≤0.070%

0.015%≤Nb≤0.100%

Ti≤0.080%

N≤0.009%

Cu≤0.100%

Ni≤0.100%

Cr≤0.100%

Mo≤0.100%

Ca≤0.006%, the rest being iron and impurities resulting from manufacturing;

for one of the precoated sheets, the steel of the substrate comprises, by weight:

0.24%≤C≤0.38%

0.40% K Mn≤3%

0.10%≤Si≤0.70%

0.015%≤Al≤0.070%

0%≤KCr≤2%

0.25%≤Ni≤2%

0.015%≤Ti≤0.10%

0%≤Nb≤0.060%

0.0005%≤B≤0.0040%

0.003%≤N≤0.010%

0.0001%≤S≤0.005%

0.0001%≤P≤0.025% wherein the titanium and nitrogen contents satisfy the following relationship:

$$Ti/N>3.42$$

and the carbon, manganese, chromium and silicon contents satisfy the following relationship $$2.6C+\frac{Mn}{5.3}+\frac{Cr}{13}+\frac{Si}{15}\geq 1.1\%,$$

the steel optionally comprising one or more of the following elements:

0.05%≤Mo≤0.65%

0.001%≤W≤0.30%

0.00050%≤Ca≤0.005% the rest being iron and impurities inevitably resulting from manufacturing;

the welding is performed using a protection gas, in particular helium and/or argon.

The present disclosure further relates to a method for producing a welded, hot press-formed and cooled steel part comprising the successive steps of:

carrying out the method as defined above in order to obtain a welded steel blank;

heating the welded steel blank so as to obtain a fully austenitic structure in the substrates of the precoated sheets;

hot press-forming the welded steel blank in a press tool to obtain a steel part; and cooling the steel part in the press tool.

According to a particular embodiment of this method for producing the welded, hot press-formed and cooled steel part, during the cooling step, the cooling rate is greater than or equal to the bainitic or martensitic cooling rate of the most hardenable among the substrates of the precoated sheets.

A welded steel blank is also provided comprising two precoated sheets, each precoated sheet comprising a steel substrate having a precoating on each of its main faces, the precoating comprising an intermetallic alloy layer comprising at least iron and aluminum and, optionally, a metallic alloy layer extending atop the intermetallic alloy layer, the metallic alloy layer being a layer of aluminum, a layer of aluminum alloy or a layer of aluminum-based alloy, the precoated sheets being joined by a weld joint, the weld joint having a mean aluminum content comprised between 0.1 wt. % and 1.2 wt. %, and the weld joint being further characterized by (a) a quenching factor $FT_{WJ}$ of the weld joint such that $FT_{WJ}-0.96FT_{BM}\geq 0$ (criterion C1), where:

$FT_{BM}$ is the quenching factor of the least hardenable steel substrate among the steel substrates of the two precoated sheets, and the quenching factors $FT_{WJ}$ and $FT_{BM}$ are determined using the following formula: $FT=128+1553\times C+55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint in the case of $FT_{WJ}$ and the least hardenable substrate in the case of $FT_{BM}$, and (b) a mean nickel content $Ni_{WJ}$ in the weld joint fulfilling the following relationship: $Ni_{WJ} \leq 14-3.4 \times Al_{WJ}$, where $Al_{WJ}$ is the mean aluminum content in the weld joint (criterion C2); and (c) a mean chromium content $Cr_{WJ}$ in the weld joint fulfilling the following relationship: $Cr_{WJ} \leq 5-2 \times Al_{WJ}$, where $Al_{WJ}$ is the mean aluminum content in the weld joint (criterion C3), and each precoated sheet comprising, on each main face thereof, adjacent the weld joint, an intermediate zone in which the precoating has been removed over a removal fraction comprised between 30% and 100% of the thickness of the precoating.

According to particular embodiments of the welded steel blank, the welded steel blank comprises one or more of the following features, taken alone or according to any technically possible combination:

the steel of the substrate of at least one of the precoated sheets, and for example of both precoated sheets comprises, by weight:

0.10%≤C≤0.5%
0.5% K Mn≤4.5%
0.1%≤Si≤1%
0.01%≤Cr≤1%
Ti≤0.2%
Al≤0.1%
S≤0.05%
P≤0.1%
B≤0.010% the rest being iron and impurities resulting from manufacturing, the substrate of each of the precoated sheets is made of a press-hardenable steel;

for each precoated sheet, the width of the intermediate zone is comprised between 5 μm and 2000 μm from the edge of the weld joint;

for at least one precoated sheet, and for example for both precoated sheets, the removal fraction is equal to 100% of the thickness of the precoating;

for at least one precoated sheet, and for example for both precoated sheets, the removal fraction strictly smaller than 100% of the thickness of the precoating;

for at least one precoated sheet, and for example for both precoated sheets, the precoating comprises a metallic alloy layer extending atop the intermetallic alloy layer, the metallic alloy layer being a layer of aluminum, a layer of aluminum alloy or a layer of aluminum-based alloy and wherein, for at least one precoated sheet, and for example for both precoated sheets, the metallic alloy layer has been removed over its entire thickness, while the intermetallic alloy layer remains integral in the removal zone on each main face of the precoated sheet;

the nickel content of the weld joint is comprised between 0.1 wt. % and 13.6 wt. %, and more particularly between 0.2 wt. % and 12.0 wt. %;

the welded steel blank is such that, after hot press-forming and cooling, the Charpy energy of the weld joint at 20° C. is greater than or equal to 25 J/cm$^2$; and the ultimate tensile strength of the hot press-formed and cooled welded steel blank is greater than or equal to the ultimate tensile strength of the weakest substrate among the substrates of the precoated sheets, the weakest substrate being the substrate for which the product of the thickness by the ultimate tensile strength after hot press-forming and cooling is the lowest;

the weld joint is such that, after hot press-forming and cooling, the maximum hardness variation ΔHV(WJ) across the weld joint is smaller than or equal to 20% of the mean hardness $HV_{mean}$(WJ) of the weld joint;

each intermediate zone comprises solidification striations, the solidification striations on adjacent main faces of the two precoated sheets being symmetrical relative to a vertical median plane between the two precoated sheets;

each intermediate zone comprises an inner edge, located at the weld joint and an outer edge, located away from the weld joint and wherein the distance between the outer edges of the adjacent intermediate zones of the two precoated sheets is constant along the longitudinal direction of the weld joint;

for at least one of the precoated sheets, and for example for both precoated sheets, the steel of the substrate comprises, by weight:

0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
B≤0.005% the rest being iron and impurities resulting from manufacturing;

for one of the precoated sheets, the steel of the substrate comprises, by weight:

0.040%≤C≤0.100%
0.80%≤Mn≤2.00%
Si≤0.30%
S≤0.005%
P≤0.030%
0.010%≤Al≤0.070%
0.015%≤Nb≤0.100%
Ti≤0.080%
N≤0.009%
Cu≤0.100%
Ni≤0.100%
Cr≤0.100%
Mo≤0.100%
Ca≤0.006%, the rest being iron and impurities resulting from manufacturing;

for one of the precoated sheets, the steel of the substrate comprises, by weight:

0.24%≤C≤0.38%
0.40%≤Mn≤3%
0.10%≤Si≤0.70%
0.015%≤Al≤0.070%
0%≤KCr≤2%
0.25%≤Ni≤2%
0.015%≤Ti≤0.10%
0%≤Nb≤0.060%
0.0005%≤B≤0.0040%
0.003%≤N≤0.010%
0.0001%≤S≤0.005%
0.0001%≤P≤0.025% wherein the titanium and nitrogen contents satisfy the following relationship:

Ti/N>3.42 and the carbon, manganese, chromium and silicon contents satisfy the following relationship $$2.6C+\frac{Mn}{5.3}+\frac{Cr}{13}+\frac{Si}{15}\geq 1.1\%,$$

the steel optionally comprising one or more of the following elements:

0.05%≤Mo≤0.65%
0.001%≤W≤0.30%
0.00050%≤Ca≤0.005% the rest being iron and impurities inevitably resulting from manufacturing.

A welded, hot press-formed and cooled steel part is also provided comprising a first coated steel part portion and a second coated steel part portion, each coated steel part portion comprising a steel substrate having, on at least one of its main faces, a coating comprising at least iron and aluminum, the first and second coated steel part portions being joined by a weld joint, the weld joint having a mean aluminum content comprised between 0.1 wt. % and 1.2 wt. %, and the weld joint being further characterized by (a) a quenching factor $FT_{WJ}$ of the weld joint such that $FT_{WJ}-0.96FT_{BM}\geq 0$ (criterion C1), where:

$FT_{BM}$ is the quenching factor of the least hardenable steel substrate among the steel substrates of the two precoated sheets, and the quenching factors $FT_{WJ}$ and $FT_{BM}$ are determined using the following formula: $FT=128+1553\times C+55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint in the case of $FT_{WJ}$ and the least hardenable substrate in the case of $FT_{BM}$, (b) a mean nickel content $Ni_{WJ}$ in the weld joint fulfilling the following relationship: $Ni\leq 14-3.4\times Al_{WJ}$, where $Al_{WJ}$ is the mean aluminum content in the weld joint (criterion C2); and (c) a mean chromium content $Cr_{WJ}$ in the weld joint fulfilling the following relationship: $Cr\leq 5-2\times Al_{WJ}$, where $Al_{WJ}$ is the mean aluminum content in the weld joint (criterion C3), and each coated steel part portion comprising, on each main face thereof, adjacent the weld joint, an intermediate zone in which the thickness of the coating is strictly smaller than in adjacent zones of the coated steel part portion located at a greater distance from the weld joint than the intermediate zone or in which the coating is absent.

According to particular embodiments of the welded, hot press-formed and cooled steel part, the welded, hot press-formed and cooled steel part may comprise one or several of the following features, taken alone or according to any possible combination:

the steel of the substrate of at least one of the first and second steel part portions, and for example of the first and the second steel part portions, comprises, by weight:

0.10%≤C≤0.5%
0.5%≤Mn≤4.5%
0.1%≤Si≤1%
0.01%≤Cr≤1%
Ti≤0.2%
Al≤0.1%
S≤0.05%
P≤0.1%
B≤0.010% the rest being iron and impurities resulting from manufacturing, the substrate of each of the first and second steel part portions is made of a press-hardenable steel;

each intermediate zone comprises solidification striations, the solidification striations on adjacent main faces of the two coated steel part portions being symmetrical relative to a vertical median plane between the two coated steel part portions;

each intermediate zone comprises an inner edge, located at the weld joint and an outer edge, located away from the weld joint and wherein the distance between the outer edges of the adjacent intermediate zones of the two coated steel part portions is constant along the longitudinal direction of the weld joint;

the mean hardness $HV_{mean}(WJ)$ in the weld joint is smaller than or equal to 700 HV;

the mean nickel content in the weld joint is comprised between 0.1 wt. % and 13.6 wt. %, and more particularly between 0.2 wt. % and 12.0 wt. %;

the Charpy energy of the weld joint at 20° C. is greater than or equal to 25 J/cm$^2$ and the ultimate tensile strength of the welded, hot press-formed and cooled steel part is greater than or equal to the ultimate tensile strength of the weakest substrate among the substrates of the coated steel part portions, the weakest substrate being the substrate for which the product of the thickness by the ultimate tensile strength is the lowest;

the maximum hardness variation $\Delta HV(WJ)$ across the weld joint is smaller than or equal to 20% of the mean hardness $HV_{mean}(WJ)$ of the weld joint;

the steel of the substrate of at least one among the first and the second coated steel part portions, and for example of the first and the second coated steel part portions comprises, by weight:

0.15%≤C≤0.25%
0.8%≤Mn≤1.8%
0.1%≤Si≤0.35%
0.01%≤Cr≤0.5%
Ti≤0.1%
Al≤0.1%
S≤0.05%
P≤0.1%
B≤0.005% the rest being iron and impurities resulting from manufacturing;

the steel of the substrate of one among the first and the second coated steel part portions comprises, by weight:

0.040%≤C≤0.100%
0.80%≤Mn≤2.00%
Si≤0.30%
S≤0.005%
P≤0.030%
0.010%≤Al≤0.070%
0.015%≤Nb≤0.100%
Ti≤0.080%
N≤0.009%
Cu≤0.100%
Ni≤0.100%
Cr≤0.100%
Mo≤0.100%
Ca≤0.006%, the rest being iron and impurities resulting from manufacturing;

the steel of the substrate of one among the first and the second coated steel part portions comprises, by weight:

0.24%≤C≤0.38%

0.40%≤Mn≤3%

0.10%≤Si≤0.70%

0.015%≤Al≤0.070%

0%≤Cr≤2%

0.25%≤Ni≤2%

0.015%≤Ti≤0.10%

0%≤Nb≤0.060%

0.0005%≤B≤0.0040%

0.003%≤N≤0.010%

0.0001%≤S≤0.005%

0.0001%≤P≤0.025% wherein the titanium and nitrogen contents satisfy the following relationship:

$$Ti/N>3.42$$

and the carbon, manganese, chromium and silicon contents satisfy the following relationship $$2.6C+\frac{Mn}{5.3}+\frac{Cr}{13}+\frac{Si}{15}\geq 1.1\%,$$

the steel optionally comprising one or more of the following elements:

0.05%≤Mo≤0.65%

0.001%≤W≤0.30%

0.00050%≤Ca≤0.005% the rest being iron and impurities inevitably resulting from manufacturing.

A welded, hot press-formed and cooled steel part is also provided as described above for producing an anti-intrusion part or an energy-absorption part for a motor vehicle.

BRIEF SUMMARY OF THE DRAWINGS

The present disclosure will be better understood upon reading the following specification, given only by way of example and with reference to the appended drawings, wherein.

DETAILED DESCRIPTION

In the entire patent application, the contents of the elements are expressed in percentages by weight (wt. %).

The present disclosure relates to a method for producing a welded steel blank 1.

The method comprises a first step of providing two precoated sheets 2.

Figure 1:
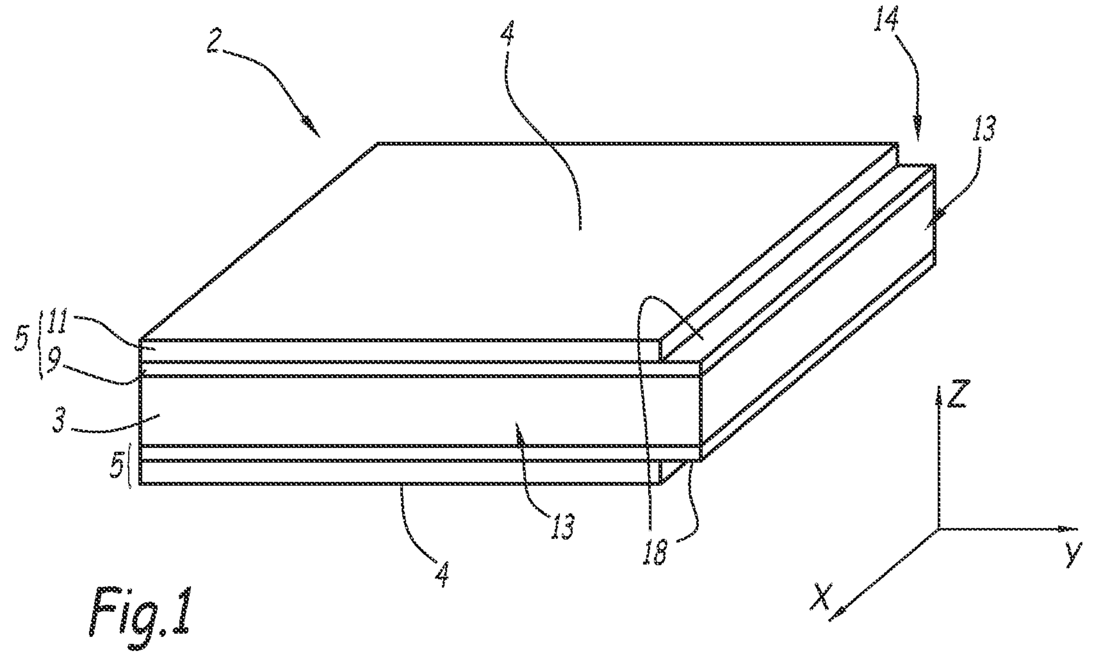
FIG. 1 is a perspective view of a precoated sheet comprising a removal zone in the precoating at the periphery of the sheet.

As shown in FIG. 1, each precoated sheet 2 comprises two main faces 4 and at least one side face 13, extending between the two main faces 4, from one main face 4 to the other. In the example shown in FIG. 1, the precoated sheet 2 comprises four side faces 13. For example, the side faces 13 form an angle comprised between 60° and 90° with one of the main faces 4.

Each precoated sheet 2 comprises a metallic substrate 3 having, on each of its main faces, a precoating 5. The precoating 5 is superimposed on the substrate 3 and in contact therewith.

The metallic substrate 3 is more particularly a steel substrate.

The steel of the substrate 3 is more particularly a steel having a ferrito-perlitic microstructure.

Preferably, the substrate 3 is made of a steel intended for thermal treatment, more particularly a press-hardenable steel, and for example a manganese-boron steel, such as for example a 22MnB5 type steel.

According to one embodiment, the steel of the substrate 3 comprises, and in particular consists of, by weight:

0.10%≤C≤0.5%

0.5%≤Mn≤3%

0.1%≤Si≤1%

0.01%≤Cr≤1%

Ti≤0.2%

Al≤0.1%

S≤0.05%

P≤0.1%

B≤0.010% the rest being iron and impurities resulting from manufacturing.

More particularly, the steel of the substrate 3 comprises, and in particular consists of, by weight:

0.15%≤C≤0.25%

0.8%≤Mn≤1.8%

0.1%≤Si≤0.35%

0.01%≤Cr≤0.5%

Ti≤0.1%

Al≤0.1%

S≤0.05%

P≤0.1%

B≤0.005% the rest being iron and impurities resulting from manufacturing.

According to an alternative, the steel of the substrate 3 comprises, and in particular consists of, by weight:

0.040%≤C≤0.100%

0.80%≤Mn≤2.00%

Si≤0.30%

S≤0.005%

P≤0.030%

0.010%≤Al≤0.070%

0.015%≤Nb≤0.100%

Ti≤0.080%

N≤0.009%

Cu≤0.100%

Ni≤0.100%

Cr≤0.100%

Mo≤0.100%

Ca≤0.006% the rest being iron and impurities resulting from manufacturing.

According to an alternative, the steel of the substrate 3 comprises, and in particular consists of, by weight:

0.24%≤C≤0.38%

0.40%≤Mn≤3%

0.10%≤Si≤0.70%
0.015%≤Al≤0.070%
0%≤Cr≤2%
0.25%≤Ni≤2%
0.015%≤Ti≤0.10%
0%≤Nb≤0.060%
0.0005%≤B≤0.0040%
0.003%≤N≤0.010%
0.0001%≤S≤0.005%
0.0001%≤P≤0.025% wherein the titanium and nitrogen contents satisfy the following relationship:

Ti/N>3.42, and the carbon, manganese, chromium and silicon contents satisfy the following relationship $$2.6C + \frac{Mn}{5.3} + \frac{Cr}{13} + \frac{Si}{15} \geq 1.1\%,$$

the steel optionally comprising one or more of the following elements:

0.05%≤Mo≤0.65%
0.001%≤W≤0.30%
0.00050%≤Ca≤0.005% the rest being iron and impurities inevitably resulting from manufacturing.

According to one example, the substrates 3 of the two precoated sheets 2 have the same composition.

According to another example, the substrates 3 of the two precoated sheets 2 have different compositions. In particular, the two substrates 3 have different compositions each chosen among the four compositions mentioned above. For example, the steel of the substrate 3 of one precoated sheet 2 has the first composition mentioned above, while the steel of the substrate 3 of the other precoated sheet 2 has a composition chosen among the second, third or fourth compositions mentioned above.

The substrate 3 may be obtained, depending on its desired thickness, by hot rolling and/or by cold-rolling followed by annealing, or by any other appropriate method.

The substrate 3 advantageously has a thickness comprised between 0.8 mm and 5 mm, and more particularly comprised between 1.0 mm and 3.0 mm. The two precoated sheets 2 may have the same thickness or different thicknesses.

The precoating 5 is obtained by hot-dip coating, i.e. by immersion of the substrate 3 into a bath of molten metal.

The precoating 5 comprises at least an intermetallic alloy layer 9 in contact with the substrate 3. The intermetallic alloy layer 9 comprises at least iron and aluminum. The intermetallic alloy layer 9 is in particular formed by reaction between the substrate 3 and the molten metal of the bath. More particularly, the intermetallic alloy layer 9 comprises intermetallic compounds of the $Fe_x$—$Al_y$ type, and more particularly $Fe_2Al_5$.

In the example shown in FIG. 1, the precoating 5 further comprises a metallic alloy layer 11 extending atop the intermetallic alloy layer 9. The metallic alloy layer 11 has a composition which is close to that of the molten metal in the bath. It is formed by the molten metal carried away by the sheet as it travels through the molten metal bath during hot-dip coating. The metallic alloy layer 11 is a layer of aluminum, or a layer of aluminum alloy or a layer of aluminum-based alloy.

In this context, an aluminum alloy refers to an alloy comprising more than 50% by weight of aluminum. An aluminum-based alloy is an alloy in which aluminum is the main element, by weight.

For example, the metallic alloy layer 11 is a layer of aluminum alloy further comprising silicon. More particularly, the metallic alloy layer 11 comprises, by weight:

8%≤Si≤11%,
2%≤Fe≤4%, the rest being aluminum and possible impurities.

The metallic alloy layer 11 has, for example, a thickness comprised between 19 μm and 33 μm or between 10 μm and 20 μm.

In the example shown in FIG. 1, where the precoating 5 comprises a metallic alloy layer 11, the thickness of the intermetallic alloy layer 9 is generally of the order of a few micrometers. In particular, its mean thickness is typically comprised between 2 and 8 micrometers.

The particular structure of the precoating 5 comprising the intermetallic alloy layer 9 and the metallic alloy layer 11 obtained by hot-dip coating is in particular disclosed in patent EP 2 007 545.

According to another embodiment, the precoating 5 only comprises the intermetallic alloy layer 9 as described above. In this case, the thickness of the intermetallic alloy layer 9 is for example comprised between 10 μm and 40 μm. Such a precoating 5 consisting of an intermetallic alloy 9 may for example be obtained by subjecting a precoating 5 comprising an intermetallic alloy layer 9 and a metallic alloy layer 11 as disclosed above to a pre-alloying treatment. Such a pre-alloying treatment is carried out at a temperature and for a holding time chosen so as to alloy the precoating 5 with the substrate 3 over at least a fraction of the thickness of the precoating 5. More particularly, the pre-alloying treatment may comprise the following steps: heating the sheet to a pre-alloying temperature comprised between 700° C. and 900° C. and holding the pre-alloyed sheet at this temperature for a time comprised between 2 minutes and 200 hours. In this case, the intermetallic alloy layer 9 may be composed of different intermetallic sublayers, such as $Fe_2Al_5$, $FeAl_3$, FeAl, $Fe_6Al_{12}Si_5$ and $FeAl_3$ sublayers.

Advantageously, as illustrated in FIG. 1, the substrate 3 has a precoating 5 as described above on both of its main faces 4.

Furthermore, as shown in FIG. 1, for each precoated sheet 2, the precoating 5 has been removed at a weld edge 14 of the precoated sheet 2, on each main face 4 of the precoated sheet 2 so as to create a removal zone 18 at the weld edge 14. More particularly, the precoating 5 has been removed over a removal fraction F comprised between 30% and 100% (boundaries included) of the thickness of the precoating 5.

The weld edge 14 comprises a peripheral portion of the precoated sheet 2, which is intended to be at least partially incorporated into the weld joint 22 during butt welding. More particularly, the weld edge 14 comprises a side face 13 of the precoated sheet 2 and a portion of the precoated sheet 2 extending from this side face 13 and comprising a portion of the precoating 5 and a portion of the substrate 3.

The removal of the removal fraction F of the precoating 5 at the weld edge 14 is preferably carried out using a laser beam, i.e. through laser ablation.

The removal zone 18 may extend over a width comprised between 0.5 mm and 3 mm from the side face 13 of the sheet 2.

Advantageously, the removal fraction F is strictly smaller than 100%, which means that only a portion of the precoating 5 is removed in the removal zone 18, while a portion thereof remains.

For example, in the embodiment shown in FIG. 1, in the removal zone 18, the metallic alloy layer 11 is removed, while the intermetallic alloy layer 9 remains over at least a fraction of its thickness. In this case, the remaining intermetallic alloy layer 9 protects the areas of the welded blank 1 immediately adjacent to the weld joint 22 from oxidation and decarburization during subsequent hot press-forming steps and from corrosion during the in-use life.

According to an embodiment, during the removal step, the intermetallic alloy layer 9 is left in its integrality or remains over a fraction of its initial thickness strictly smaller than 100%, such as, for example, over only 60%, 80% or 90% of its initial thickness.

According to an alternative embodiment (not shown), during the removal step, the precoating 5 is removed over its entire thickness in the removal zone 18. In this embodiment, the removal fraction corresponds to 100% of the thickness of the precoating 5. In this embodiment, the precoating 5 is absent in the removal zone 18.

Figure 2:
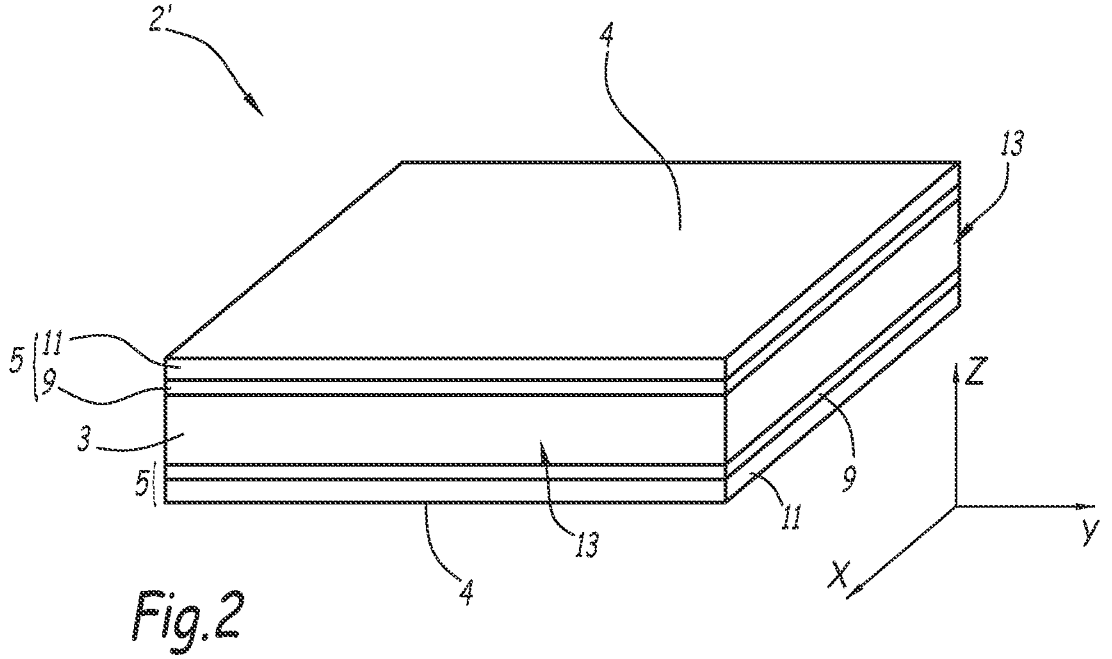
FIG. 2 is a perspective view of an initial precoated sheet.

More particularly, the method comprises, prior to the provision step, a step of producing the two precoated sheets 2 as shown in FIG. 1 from respective initial precoated sheets 2' as shown in FIG. 2.

The initial precoated sheets 2' have substantially the same geometry and composition as the precoated sheets 2, the only difference being the absence of the removal zones 18. In other words, the precoating 5 of the initial precoated sheets 2' remains integral on both main faces 4 of the initial precoated sheets 2'. It entirely covers the two main faces of the initial precoated sheets 2'.

This step comprises a sub-step of obtaining the removal zone 18 on each main face 4 of each precoated sheet 2 through removal of the precoating 5 over the removal fraction F at the weld edge 14 through laser ablation.

Optionally, the method further comprises a step of preparing the weld edge 14 of at least one of the precoated sheets 2, and for example both precoated sheets 2.

The preparation of the weld edge 14 may comprise at least one of the following processing steps:

brushing of the weld edge 14, machining of the weld edge 14, chamfering of the weld edge 14, and/or beveling of the weld edge 14.

The brushing step allows at least partially removing the traces of precoating 5 on the weld edge 14, and more particularly on the side face 13, resulting from mechanical cutting operations and/or from the removal of the precoating 5 at the weld edge 14.

Chamfering or beveling the weld edge 14 allows increasing the amount of filler material added without resulting in an over-thickness at the weld joint 22.

Machining of the weld edge 14 is carried out in case the shape of the weld edge 14 prior to machining is not sufficiently straight for laser welding.

The method further comprises a step of butt welding the precoated sheets 2, after an optional preparation of the weld edge 14, using a filler wire 20 so as to obtain a welded steel blank 1.

Figure 3:
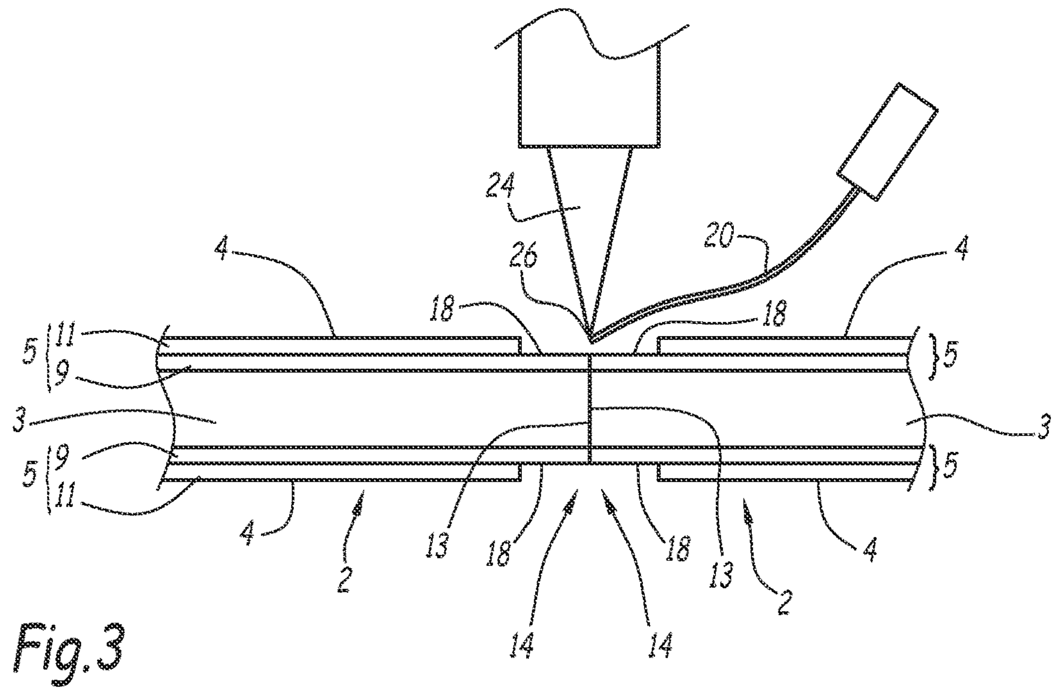
FIG. 3 is a schematic cross-sectional view of the beginning of the welding step of a method according to the present disclosure.
Figure 4:
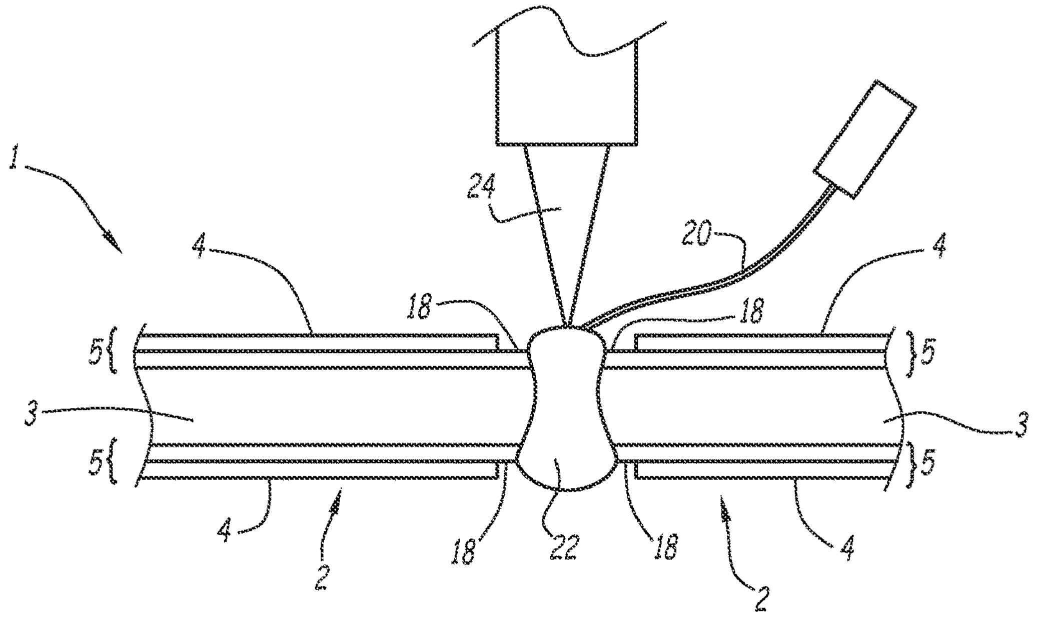
FIG. 4 is a schematic cross-sectional view of the end of the welding step of the method according to the present disclosure.

FIGS. 3 and 4 illustrate two stages of the welding step to create the welded steel blank 1.

In the example shown in FIGS. 3 and 4, the two precoated sheets 2 are precoated sheets as shown in FIG. 1, which comprise a removal zone 18 at the respective weld edges 14, in which the metallic alloy layer 11 has been removed over its entire thickness, while the intermetallic alloy layer 9 remains integral.

The welding operation results in the formation of a molten metal zone at the junction between the two sheets 2, which subsequently solidifies forming the weld joint 22.

The welding step is in particular a laser welding step, in which a laser beam 24 is directed towards the junction between the two sheets 2. This laser beam 24 is configured for melting the filler wire 20 at the point of impact 26 of the laser beam 24.

The laser welding step is for example carried out using a $CO_2$ laser or a solid state laser.

The laser source is preferably a high-powered laser source. It may be for example be selected from among a $CO_2$ laser with a wavelength of approximatively 10 micrometers, a solid state laser source with a wavelength of approximatively 1 micrometer or a semi-conductor laser source, for example a diode laser with a wavelength approximatively comprised between 0.8 and 1 micrometer.

The power of the laser source is chosen depending on the thickness of the sheets 2. In particular, the power is chosen so as to allow the fusion of the filler wire 20 and of the weld edges 14 of the sheets 2, as well as a sufficient mixing in the weld joint 22. For a $CO_2$ laser, the laser power is for example comprised between 3 kW and 12 kW. For a solid state laser or a semi-conductor laser, the laser power is for example comprised between 2 kW and 8 kW.

The diameter of the laser beam 24 at the point of its impact 26 on the sheets 2 may be equal to about 600 μm for both types of laser sources.

During the welding step, the welding is for example carried out under a protective atmosphere. Such a protective atmosphere in particular prevents the oxidation and decarburization of the area where the weld is being performed, the formation of boron nitride in the weld joint 22 and possible cold cracking due to hydrogen absorption.

The protective atmosphere is, for example, an inert gas or a mixture of inert gases. The inert gases may be helium or argon or a mixture of these gases.

During this welding step, the distance between the facing side faces 13 of the two sheets 1 is for example smaller than or equal to 0.3 mm, and more particularly smaller than or equal to 0.1 mm. Providing such a clearance between the facing side faces 13 of the two sheets 1 promotes the deposition of the filler metal during the welding operation and prevents the formation of an over-thickness at the weld joint 22. The deposition of the filler metal and the prevention of an over-thickness are also improved in the case where, during the preparation step, a chamfered or beveled edge has been produced at the weld edges 14 of the sheets 2.

In particular, the mean aluminum content $Al_{WJ}$ in the weld joint 22 is comprised between 0.1 wt. % and 1.2 wt. %. More particularly, the mean aluminum content $Al_{WJ}$ in the weld joint 22 is greater than or equal to 0.15 wt. %. The mean aluminum content $Al_{WJ}$ in the weld joint 22 is for example smaller than or equal to 0.8 wt. %.

This mean aluminum content $Al_{WJ}$ results from the portion of precoating 5 possibly remaining in the removal zone 18 after removal of the removal fraction F, as well as from the traces of aluminum present on the side face(s) 13 at the weld edge(s) 14, resulting from the removal operation and/or from the cutting operation. In the weld joint 22, it is mixed with the steel of the substrate 3 and of the filler wire 20.

During the welding step, the proportion of filler wire 20 added to the weld pool is for example comprised between 10% and 50%, and more particularly between 10% and 40%.

According to the present disclosure, the composition of the filler wire 20 and the proportion of filler wire 20 added to the weld pool are chosen in such a manner that the thus obtained weld joint 22 is characterized by:

(a) a quenching factor $FT_{WJ}$ of the weld joint 22 such that $FT_{WJ}-0.96FT_{BM}\geq 0$ (criterion C1),
 where:
 $FT_{BM}$ is the quenching factor of the least hardenable steel substrate 3 among the steel substrates 3 of the two precoated sheets 2, and
 the quenching factors $FT_{WJ}$ and $FT_{BM}$ are determined using the following formula: $FT=128+1553\times C+55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, where Al, Cr, Ni, C, Mn and Si are, respectively, the mean aluminum, chromium, nickel, carbon, manganese and silicon content, expressed in weight percent, of the area whose quenching factor is to be determined, this area being the weld joint 22 in the case of $FT_{WJ}$ and the least hardenable substrate 3 in the case of $FT_{BM}$;

(b) a mean nickel content $Ni_{WJ}$ of the weld joint 22 fulfilling the following relationship: $Ni_{WJ}\leq 14-3.4\times Al_{WJ}$, where $Al_{WJ}$ is the mean aluminum content of the weld joint (criterion C2); and (c) a mean chromium content $Cr_{WJ}$ of the weld joint 22 fulfilling the following relationship: $Cr_{WJ}\leq 5-2\times Al_{WJ}$, where $Al_{WJ}$ is the mean aluminum content of the weld joint 22 (criterion C3).

The least hardenable substrate 3 among the substrates 3 of the precoated sheets 2 is the substrate 3 having the lowest carbon content.

Indeed, the inventors of the present disclosure have found, in a surprising manner, that when the above criteria C1, C2 and C3 are cumulatively fulfilled, the part obtained from such a welded steel blank 1 after thermal treatment including an austenitization step (hot press-forming and cooling in the press tool) exhibits a Charpy energy greater than or equal to 25 J/cm$^2$ at 20° C. in the weld joint 22 and an ultimate tensile strength greater than or equal to the ultimate tensile strength of the weakest substrate among the substrates 3 of the precoated sheets 2.

The weakest substrate 3 is the substrate for which the product of the thickness by the ultimate tensile strength after hot press-forming and cooling is the lowest.

In particular, a Charpy energy of the weld joint 22 at 20° C. greater than or equal to 25 J/cm$^2$ allows avoiding fully brittle fracture in the weld joint.

Therefore, when the above criteria C1, C2 and C3 are cumulatively fulfilled, the presence of the weld joint 22 does not lower the properties of the welded steel part obtained by hot press-forming and cooling from the welded blank as compared to the properties, after hot press-forming and cooling, of the weakest substrate 3 among the substrates 3 of the precoated sheets 2, even if the weld joint 22 comprises a relatively high aluminum content.

Therefore, it is possible, through the method according to the present disclosure, to obtain a part having a satisfactory crash performance, despite a possibly relatively high aluminum content in the weld joint 22.

Preferably, the composition of the filler wire 20 and the proportion of filler wire 20 added to the weld pool are further chosen in such a manner that the mean nickel content $Ni_{WJ}$ of the weld joint 22 is comprised between 0.1 wt. % and 13.7 wt. %, and more particularly between 0.2 wt. % and 12.0 wt. %.

For example, the composition of the filler wire 20 and the proportion of filler wire 20 added to the weld pool are further chosen in such a manner that the mean chromium content $Cr_{WJ}$ of the weld joint 22 is greater than or equal to 0.05 wt. %. Such a chromium content in the weld joint is advantageous, since it improves the corrosion resistance and hardenability of the weld joint 22.

Preferably, the composition of the weld joint 22 is such that it has a majoritarily martensitic microstructure after hot press-forming and cooling. By "majoritarily", it is meant that it comprises at least 95% of martensite, and more particularly 100% of martensite.

The filler wire 20 in particular has a carbon content comprised between 0.01 wt. % and 0.45 wt. %. According to an example, the carbon content of the filler wire 20 is greater than or equal to the carbon content of the least hardenable substrate 3 among the substrates 3 of the two precoated sheets 2.

Indeed, the inventors of the present disclosure have found, in a surprising manner, that, in order to reduce the risk of occurrence of carbon segregations and consequently hardness peaks in the weld joint 22 after hot press-forming and cooling in the press tool, especially in the presence of important amounts of aluminum in the weld joint 22, the carbon content in the filler wire should be comprised between 0.01 wt. % and 0.45 wt. %. Therefore, using such a filler wire 20 reduces the risk of brittleness of the weld joint 22 and participates in avoiding failure in the weld joint 22 of the part obtained after hot press-forming and cooling in the press tool under tension perpendicular to the weld joint 22.

In particular, the inventors of the present disclosure have observed that the carbon content in the filler wire should be comprised between 0.01 wt. % and 0.45 wt. % in order to be able to obtain a weld joint 22 wherein the maximum hardness variation ΔHV(WJ) across the weld joint 22 is smaller than or equal to 20% of the mean hardness $HV_{mean}$(WJ) of the weld joint 22, in other words, $$\frac{\Delta HV(WJ)}{HV_{mean}(WJ)}\times 100\leq 20\%,$$

where ΔHV(WJ) is the difference between the maximum and the minimum hardness measured in the weld joint 22 and $HV_{mean}$(WJ) is the mean hardness measured in the weld joint 22.

Preferably, the filler wire 20 has a manganese content strictly smaller than the manganese content of the substrates 3 of the precoated sheets 2.

For example, the filler wire 20 has the following composition, by weight:

$0.01\%\ C\leq 0.45\%$, and for example $0.02\%\leq C\leq 0.45\%$
$0.001\%\ Mn\leq 0.45\%$, and for example $0.05\%\ Mn\leq 0.45\%$, even more particularly $0.05\%\leq Mn\leq 0.20\%$,
$0.001\%\leq Si\leq 1\%$
$0.02\%\leq Ni\leq 56\%$, and for example between $0.2\%\leq Ni\leq 10.0\%$,
$0.001\%\leq Cr\leq 30\%$
$0.001\%\leq Mo\leq 5\%$
$0.001\%\leq Al\leq 0.30\%$
$0.001\%\leq Cu\leq 1.80\%$
$0.001\%\leq Nb\leq 1.50\%$ 0.001%≤Ti≤0.30%
0.001%≤N≤10%
0.001%≤V≤0.1%
0.001%≤Co≤0.20%
the rest being iron and unavoidable impurities.

In the above exemplary filler wire composition, contents of Mn, Si, Cr, Mo, Al, Cu, Nb, Ti, N, V and Co equal to about 0.001% correspond to traces of these elements at the level of impurities resulting from the fusion of the raw materials and from the elaboration or result from the precision of the measuring devices for very low contents, which may result in the fact that an element completely absent from the analyzed steel be measured as present at very low contents, or that an element present at very low contents be measured as absent from the steel.

For example, the filler wire 20 consists of the above-mentioned elements.

The filler wire 20 is for example a solid wire or a flux cored wire.

The present disclosure also relates to a welded steel blank 1 which may be obtained using the above-mentioned method.

Figure 5:
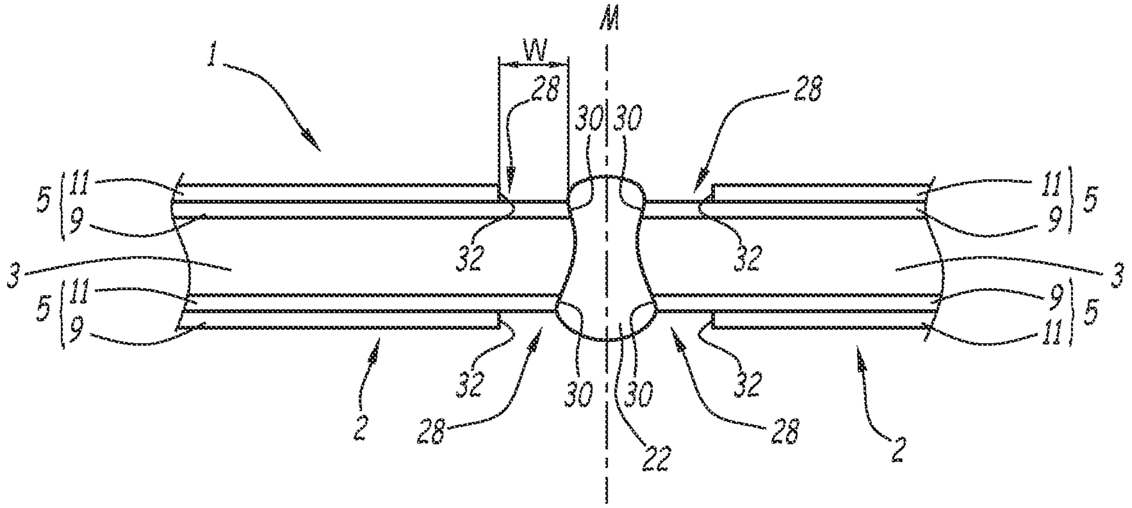
FIG. 5 is a schematic cross-sectional view of a welded steel blank according to the present disclosure.

An example of such a welded steel blank is shown in FIG. 5.

The welded steel blank 1 comprises two precoated sheets 2, each precoated sheet 2 comprising a steel substrate 3 having a precoating 5 on each of its main faces 4, the precoating 5 comprising an intermetallic alloy layer 9 comprising at least iron and aluminum and, optionally, a metallic alloy layer 11 extending atop the intermetallic alloy layer 9, the metallic alloy layer 11 being a layer of aluminum, a layer of aluminum alloy or a layer of aluminum-based alloy, the precoated sheets 2 being joined by a weld joint 22.

The welded steel blank 1 comprises, on each side of the weld joint 22, an intermediate zone 28 in which the precoating 5 has been removed over a removal zone F as defined above.

Furthermore, as can be seen in FIG. 5, each intermediate zone 28 comprises an inner edge 30, located at the weld joint 22 and an outer edge 32, located away from the weld joint 22.

The width W of each intermediate zone 28 measured from the edge of the weld joint 22, i.e. the distance between the inner edge 30 and the outer edge 32, is comprised between 5 μm and 2000 μm, and more particularly between 5 μm and 1500 μm.

Preferably, in the intermediate zone 28, the precoating 5 has been removed over a removal fraction F strictly smaller than 100%. In particular, the metallic alloy layer 11 has been removed, but the intermetallic alloy layer 9 remains integral.

According to an alternative, in the intermediate zone 28, the precoating 5 has been removed over a removal fraction F equal to 100%, i.e. over its entire thickness.

Therefore, in the intermediate zone 28, the thickness of the precoating 5 is strictly smaller than in the zones of the precoated sheets 2 located further away from the weld joint 22, or is even absent.

The intermediate zone 28 results from the removal zone 18 on the corresponding precoated sheet 2.

The precoated sheets 2 and the weld joint 22 have the features disclosed above in relation to the method for producing the welded steel blank 1.

Therefore, the weld joint 22 respects the criteria C1, C2 and C3 defined above.

Furthermore, the mean aluminum content $Al_{WJ}$ of the weld joint 22 is comprised between 0.1 wt. % and 1.2 wt. %. More particularly, the mean aluminum content $Al_{WJ}$ of the weld joint 22 is greater than or equal to 0.15 wt. %. The mean aluminum content $Al_{WJ}$ of the weld joint 22 is for example smaller than or equal 0.8 wt. %.

The weld joint 22 is for example such that, after hot press-forming and cooling in the press tool, the Charpy energy of the weld joint 22 at 20° C. is greater than or equal to 25 J/cm$^2$.

Furthermore, after hot press-forming and cooling, the ultimate tensile strength of the hot press-formed and cooled welded steel blank is greater than or equal to the ultimate tensile strength of the weakest substrate among the substrates 3 of the precoated sheets 2. In this context, the weakest substrate is defined as described above.

For example, the mean nickel content $Ni_{WJ}$ of the weld joint 22 is comprised between 0.1 wt. % and 13.6 wt. %, and more particularly between 0.2 wt. % and 12.0 wt. %.

For example, the mean chromium content $Cr_{WJ}$ of the weld joint 22 is greater than or equal to 0.05 wt. %.

The weld joint 22 is for example such that, after hot press-forming and cooling in the press tool, the maximum hardness variation ΔHV(WJ) across the weld joint 22 is smaller than or equal to 20% of the mean hardness $HV_{mean}$ (WJ) of the weld joint 22. In other words, $$\frac{\Delta HV(WJ)}{HV_{mean}(WJ)} \times 100 \leq 20\%.$$

The weld joint 22 is for example such that the mean hardness $HV_{mean}$(WJ) in the weld joint 22 after hot press-forming and cooling in the press tool is smaller than or equal to 700 HV.

Preferably, the composition of the weld joint 22 is such that it has a majoritarily martensitic microstructure after hot press-forming and cooling. By "majoritarily", it is meant that it comprises at least 95% of martensite, and more particularly 100% of martensite.

The present disclosure also relates to a method for producing a welded, hot press-formed and cooled steel part comprising:

- producing a welded steel blank 1 using the method as described above;
- heating the welded steel blank 1 so as to obtain a fully austenitic structure in the substrates 3 of the precoated sheets 2 constituting the welded blank 1;
- hot press-forming the welded steel blank 1 in a press tool to obtain a steel part; and
- cooling the steel part in the press tool.

More particularly, during the heating step, the welded steel blank 1 is heated to an austenitization temperature. It is then held at the austenitization temperature for a holding time depending on the thickness of the sheets 2 forming the welded steel blank 1. The holding time is chosen depending on the austenitization temperature in such a manner that the welded blank 1 is austenitized and such that an alloyed intermetallic layer of predetermined thickness is formed by alloying between the substrates 3 and the precoating 5. For example, the holding time is equal to about 5 minutes.

Prior to hot press-forming, the thus heated welded steel blank 1 is transferred into the hot forming press tool. The transfer time is advantageously comprised between 5 and 10 seconds.

The transfer time is chosen to be as short as possible in order to avoid metallurgical transformations in the welded steel blank 1 prior to hot press-forming.

During the cooling step, the cooling rate is greater than or equal to the critical martensitic or bainitic cooling rate of at least one of the substrates 3 of the two steel sheets 2, and for example of the most hardenable steel sheet 1, i.e. the steel sheet having the lowest critical cooling rate.

After cooling, the weld joint 22 has a majoritarily martensitic microstructure. By "majoritarily", it is meant that it comprises at least 95% of martensite, and more particularly 100% of martensite.

The present disclosure also relates to the welded, hot press-formed and cooled steel part obtained using the above-described method.

More particularly, this steel part comprises a first coated steel part portion and a second coated steel part portion, respectively resulting from the hot press-forming and cooling in the press tool of the two precoated steel sheets 2.

More particularly, each coated steel part portion comprises a steel substrate having, on each of its main faces, a coating comprising iron and aluminum, the first and second steel part portions being joined by a weld joint 22 as described above.

In particular, the coating of the first and second steel part portions results from the at least partial alloying of the precoating 5 during the hot-press forming.

The substrates of the first and second steel part portions have the compositions described above for the precoated sheets 2. They result from the hot-press forming and cooling of the substrates 3 of the precoated sheets 2.

Each steel part portion comprises, adjacent to the weld joint 22, and on each face of the steel part portion, an intermediate zone. This intermediate zone results from the intermediate zone 28 described with respect to the welded blank 1. In the intermediate zone, the thickness of the coating is strictly smaller than in the rest of the steel part portion, or the coating is even absent.

The weld joint 22 respects the criteria C1, C2 and C3 defined above.

Furthermore, the weld joint 22 has a mean aluminum content $Al_{WJ}$ comprised between 0.1 wt. % and 1.2 wt. %. The mean aluminum content of the weld joint 22 is for example greater than or equal to 0.15 wt. %. For example, the mean aluminum content of the weld joint 22 is smaller than or equal to 0.8 wt. %.

The Charpy energy of the weld joint 22 at 20° C. is greater than or equal to 25 J/cm$^2$ and the ultimate tensile strength of the part is greater than or equal to the ultimate tensile strength of the weakest substrate among the substrates 3 of the coated steel part portions.

For example, the weld joint 22 has a mean nickel content $Ni_{WJ}$ comprised between 0.1 wt. % and 13.6 wt. %, and more particularly between 0.2 wt. % and 12.0 wt. %.

For example, the weld joint 22 has a mean chromium content $Cr_{WJ}$ greater than or equal to 0.05 wt. %.

The weld joint 22 is for example such that the maximum hardness variation ΔHV(WJ) across the weld joint 22 is smaller than or equal to 20% of the mean hardness $HV_{mean}$ (WJ) of the weld joint 22. In other words, $$\frac{\Delta HV(WJ)}{HV_{mean}(WJ)} \times 100 \leq 20\%.$$

The mean hardness $HV_{mean}$(WJ) in the weld joint 22 is for example smaller than or equal to 700 HV.

Preferably, the weld joint 22 has a majoritarily martensitic microstructure. By "majoritarily", it is meant that it comprises at least 95% of martensite, and more particularly 100% of martensite.

The inventors of the present disclosure have carried out experiments in which welded steel blanks 1 were produced by butt laser welding together two precoated sheets A and B using a filler wire W.

Table 1 below lists the experimental conditions for each of the experiments E1 to E20 carried out.

The precoated sheets A and B initially provided had a precoating 5 on both of their main faces 4 with a thickness of about 25 micrometers.

For all of the tested precoated sheets A and B, the precoating 5 was obtained by hot-dip coating in a bath of molten metal and comprised a metallic alloy layer 11 and an intermetallic alloy layer 9.

The metallic alloy layer 11 of the precoating 5 comprised, by weight:

Si: 9%

Fe: 3%, the rest consisting of aluminum and possible impurities resulting from elaboration.

The metallic alloy layer 11 had an average total thickness of 20 μm.

The intermetallic alloy layer 9 contained intermetallic compounds of the $Fe_x$—$Al_y$ type, and majoritarily $Fe_2Al_3$. $Fe_2Al_5$ and $Fe_xAl_ySi_z$. It has an average thickness of 5 μm.

For all of the tested precoated sheets A and B, a removal zone 18 has been created on both main faces by removal of the metallic alloy layer 11, while leaving the intermetallic alloy layer integral. The removal was carried out through laser ablation using the method disclosed in prior application WO 2007/118939.

TABLE 1

List of experimental conditions

| Exp. | Composition substrate sheet A | Thickness sheet A (mm) | Composition substrate sheet B | Thickness sheet B (mm) | Filler wire W | Proportion of filler wire added to weld pool (%) |
|---|---|---|---|---|---|---|
| E1 | S2 | 1.0 | S2 | 1.0 | W1 | 20 |
| E2 | S2 | 1.0 | S2 | 1.0 | W2 | 21 |
| E3 | S1 | 1.0 | S1 | 1.01 | n.a. | 0 |
| E4 | S1 | 2.0 | S1 | 1.4 | W1 | 20 |
| E5 | S1 | 2.0 | S1 | 1.4 | W2 | 23 |
| E6 | S1 | 1.0 | S1 | 1.0 | W4 | 19 |
| E7 | S3 | 1.0 | S3 | 1.0 | W1 | 5 |
| E8 | S3 | 1.0 | S3 | 1.0 | W1 | 17 |
| E9 | S3 | 1.0 | S3 | 1.0 | W2 | 20 |
| E10 | S3 | 1.0 | S3 | 1.0 | W3 | 17 |
| E11 | S3 | 1.0 | S3 | 1.0 | W4 | 18 |
| E12 | S3 | 1.0 | S3 | 1.0 | W1 | 34 |
| E13 | S3 | 1.0 | S3 | 1.0 | W2 | 42 |
| E14 | S3 | 1.0 | S3 | 1.0 | W3 | 33 |
| E15 | S3 | 1.0 | S3 | 1.0 | W4 | 37 |
| E16 | S3 | 1.0 | S3 | 1.0 | W2 | 20 |
| E17 | S3 | 1.0 | S3 | 1.0 | W3 | 16 |
| E18 | S3 | 1.0 | S3 | 1.0 | W4 | 18 |
| E19 | S3 | 1.0 | S3 | 1.0 | W4 | 18 |
| E20 | S3 | 1.8 | S3 | 1.4 | W4 | 24 |
| E21 | S3 | 1.0 | S4 | 1.2 | W5 | 23 |
| E22 | S3 | 1.0 | S4 | 1.2 | W5 | 19 |

In the above table, the experiments which are not according to the present disclosure are underlined.

In the above table, "0" in the column "Proportion of filler wire added to the weld pool" means that no filler wire was added.

The steel substrates used in the different experiments mentioned in Table 1 have the compositions listed in Table 2 below, the contents being expressed in weight %.

TABLE 2

| | Compositions of the substrates | | | | | | | | | |
|---|---|---|---|---|---|---|---|---|---|---|
| | % C | % Mn | % Si | % Al | % Cr | % Ni | % Ti | %B | % S | % P |
| S1 | 0.22 | 1.17 | 0.28 | 0.04 | 0.19 | — | 0.04 | 0.0031 | 0.002 | 0.014 |
| S2 | 0.22 | 1.18 | 0.26 | 0.05 | 0.19 | — | 0.032 | 0.0032 | 0.002 | 0.016 |
| S3 | 0.23 | 1.19 | 0.25 | 0.03 | 0.17 | — | 0.004 | 0.0026 | 0.0006 | 0.01 |
| S4 | 0.24 | 1.24 | 0.27 | 0.04 | 0.17 | — | — | — | — | — |

For all the substrates, the rest of the composition is iron, possible impurities and unavoidable elements resulting from the manufacturing.

In the above Table 2, "-" means that the substrate comprises at most traces of the considered element.

The filler wires W used in the different experiments mentioned in Table 1 have the compositions listed in Table 3 below, the contents being expressed in weight %.

TABLE 3

| Composition of the filler wires W | | | | | | | | | |
|---|---|---|---|---|---|---|---|---|---|
| Filler wire W | % C | % Mn | % Si | % Cr | % Ni | % Mo | % P | % S | Other elements (in %) |
| W1 | 0.29 | 0.94 | 0.13 | 0.04 | 0.05 | 0.008 | 0.01 | 0.004 | |
| W2 | 0.36 | 0.38 | 0.29 | 1.75 | 3.79 | 0.27 | 0.009 | <0.0015 | |
| W3 | 0.27 | 0.34 | 0.40 | — | 12.37 | — | <0.001 | <0.001 | |
| W4 | 0.02 | 0.30 | 0.30 | 0.05 | 53.24 | <0.021 | <0.001 | 0.002 | Al 0.058 |
| W5 | 0.03 | 1.80 | 0.50 | 20.50 | 25.00 | 4.70 | <0.001 | <0.001 | |

For all the welding wires, the rest of the composition is iron, possible impurities and unavoidable elements resulting from the manufacturing.

Unless otherwise specified, these filler wires may comprise Al, Cu, Nb, Ti, N, V and Co at contents equal to about 0.001% corresponding to traces of these elements.

The inventors then measured, for each experiment E1 to E21, the composition of the obtained weld joint 22, using conventional measurement methods.

The mean manganese, aluminum, nickel, chromium and silicon contents of the weld joint 22 were determined by averaging over the entire surface of the weld analysed using an Energy Dispersive Spectroscopy detector integrated on a Scanning Electron Microscope. The mean carbon content was determined using a Castaing electron microprobe on a cross-section of the samples taken perpendicularly to the weld joint 22. The results of these measurements are indicated in Table 4 below.

TABLE 4

| Measured contents in the weld joints | | | | | | |
|---|---|---|---|---|---|---|
| Experiment | % C | % Mn | % Si | % Al | % Cr | % Ni |
| E1 | 0.24 | 1.05 | 0.26 | 0.25 | 0.14 | 0.01 |
| E2 | 0.26 | 1.02 | 0.26 | 0.21 | 0.43 | 0.57 |
| E3 | 0.22 | 1.05 | 0.29 | 0.54 | 0.15 | 0.02 |
| E4 | 0.23 | 0.99 | 0.29 | 0.51 | 0.14 | 0.04 |
| E5 | 0.25 | 0.89 | 0.28 | 0.35 | 0.47 | 0.70 |
| E6 | 0.18 | 0.98 | 0.25 | 0.37 | 0.11 | 9.90 |
| E7 | 0.22 | 1.10 | 0.49 | 0.28 | 0.16 | 0.01 |
| E8 | 0.24 | 1.03 | 0.51 | 0.29 | 0.14 | 0.01 |
| E9 | 0.26 | 1.19 | 0.25 | 0.36 | 0.41 | 0.57 |
| E10 | 0.24 | 0.96 | 0.53 | 0.37 | 0.14 | 2.20 |
| E11 | 0.19 | 1.05 | 0.25 | 0.34 | 0.12 | 7.79 |
| E12 | 0.25 | 1.00 | 0.41 | 0.15 | 0.11 | 0.01 |
| E13 | 0.28 | 0.83 | 0.26 | 0.30 | 0.71 | 1.29 |
| E14 | 0.24 | 1.02 | 0.28 | 0.27 | 0.12 | 4.08 |

TABLE 4-continued

| Measured contents in the weld joints | | | | | | |
|---|---|---|---|---|---|---|
| Experiment | % C | % Mn | % Si | % Al | % Cr | % Ni |
| E15 | 0.15 | 0.93 | 0.20 | 0.29 | 0.11 | 17.36 |
| E16 | 0.26 | 0.93 | 0.22 | 0.86 | 0.48 | 0.54 |

TABLE 4-continued

| Measured contents in the weld joints | | | | | | |
|---|---|---|---|---|---|---|
| Experiment | % C | % Mn | % Si | % Al | % Cr | % Ni |
| E17 | 0.24 | 1.16 | 0.25 | 1.04 | 0.13 | 2.19 |
| E18 | 0.19 | 0.95 | 0.27 | 0.73 | 0.14 | 8.77 |
| E19 | 0.19 | 1.05 | 0.23 | 0.24 | 0.18 | 13.52 |
| E20 | 0.17 | 1.15 | 0.35 | 1.03 | 0.16 | 12.59 |
| E21 | 0.19 | 1.16 | 0.31 | 1.00 | 4.66 | 5.65 |
| E22 | 0.19 | 1.12 | 0.31 | 0.86 | 3.80 | 4.65 |

Furthermore, the inventors subjected the thus produced welded steel blanks 1 to a heat treatment comprising an austenitization, followed by rapid cooling so as to obtain heat treated parts. Such heat treated parts have the same properties as hot press-formed and cooled parts.

The inventors then carried out measurements to determine the mechanical properties of these parts (ultimate tensile strength of the hot press-formed and cooled parts and Charpy energy of the weld joint).

They further compared the measured ultimate tensile strength of the hot press-formed and cooled parts ($UTS_{part}$) with the ultimate tensile strength of the weakest substrate after heat treatment ($UTS_{weakest\ substrate}$).

The thus determined mechanical properties are shown in Table 5 below.

TABLE 5

| Mechanical properties after heat treatment | | |
|---|---|---|
| Experiment | $UTS_{part}$/ $UTS_{weakest\ substrate}$ (%) | Charpy energy at 20° C. after heat treatment (J/cm$^2$) |
| E1 | 112 | 37 |
| E2 | 106 | 67 |

TABLE 5-continued

| Mechanical properties after heat treatment | | |
|---|---|---|
| Experiment | $UTS_{part}$/ $UTS_{weakest\ substrate}$ (%) | Charpy energy at 20° C. after heat treatment (J/cm²) |
| E3 | 83 | 13 |
| E4 | 103 | 18 |
| E5 | 116 | 38 |
| E6 | 112 | 35 |
| E7 | 107 | 33 |
| E8 | 103 | 43 |
| E9 | 101 | 61 |
| E10 | 100 | 44 |
| E11 | 103 | 26 |
| E12 | 107 | 28 |
| E13 | 105 | 50 |
| E14 | 103 | 45 |
| E15 | 95 | 26 |
| E16 | 90 | 24 |
| E17 | 100 | 28 |
| E18 | 102 | 31 |
| E19 | 74 | 26 |
| E20 | 82 | n.d. |
| E21 | n.d. | 14 |
| E22 | n.d. | 20 |

In the above table, "n.d." means "not determined".

Tensile testing was carried out at ambient temperature (about 20° C.) using the method disclosed in the following standards: NF EN ISO 4136 and NF ISO 6892-1 on a transverse welded tensile specimen of the type EN 12.5×50 (240×30 mm), extracted perpendicular to the laser weld direction. For each experiment (E1 to E21), five tensile tests were carried out.

The Charpy energy was measured using a standard Charpy impact test using a specimen having a V-shaped notch in the weld joint 22, the V-shaped notch having a depth of 2 mm and a total width of 8 mm, with the notch positioned in the weld joint with an accuracy better than or equal to 0.2 mm, the width being the dimension of the specimen parallel to the depth of the notch. The tests were carried out at 20° C.

Based on the measured compositions of the weld joints 22, the inventors determined, for each of the experiments E1 to E22, whether or not the criteria C1 to C3 defined above are complied with.

The results of this determination are summarized in Table 6 below.

TABLE 6

| Determination of the criteria in the weld joints | | | |
|---|---|---|---|
| | Criteria | | |
| Experiment | C1 $FT_{WJ}$-0.96*$FT_{BM}$ | C2 14-3.4* $Al_{WJ}$-$Ni_{WJ}$ | C3 5-2*$Al_{WJ}$-$Cr_{WJ}$ |
| E1 | 8.36 | 13.15 | 4.36 |
| E2 | 42.62 | 12.72 | 4.15 |
| E3 | −21.68 | 12.14 | 3.77 |
| E4 | −9.34 | 12.23 | 3.84 |
| E5 | 35.32 | 12.11 | 3.83 |
| E6 | 122.83 | 2.84 | 4.15 |
| E7 | 28.22 | 13.05 | 4.28 |
| E8 | 45.48 | 13.01 | 4.28 |
| E9 | 35.10 | 12.21 | 3.87 |
| E10 | 105.12 | 10.54 | 4.12 |
| E11 | 122.98 | 5.05 | 4.20 |
| E12 | 48.20 | 13.49 | 4.59 |
| E13 | 70.00 | 11.69 | 3.69 |
| E14 | 121.54 | 9.00 | 4.34 |

TABLE 6-continued

| Determination of the criteria in the weld joints | | | |
|---|---|---|---|
| | Criteria | | |
| Experiment | C1 $FT_{WJ}$-0.96*$FT_{BM}$ | C2 14-3.4* $Al_{WJ}$-$Ni_{WJ}$ | C3 5-2*$Al_{WJ}$-$Cr_{WJ}$ |
| E15 | −20.10 | −4.35 | 4.31 |
| E16 | 11.65 | 8.27 | 2.79 |
| E17 | 99.21 | 2.75 | 3.40 |
| E18 | 58.63 | −2.09 | 2.78 |
| E19 | 67.37 | 4.95 | −1.66 |
| E20 | 63.47 | 6.43 | −0.52 |

Underlined values: not corresponding to the present disclosure

As can be seen from Table 6, the experiments referenced E1, E2, E5 to E14, E16 and E17 are examples according to the present disclosure: in these experiments, criteria C1 to C3 are satisfied.

On the contrary, the experiments referenced E3, E4, E15, E18 to E20 are not according to the present disclosure: in these experiments, at least one criterion among criteria C1 to C3 is not satisfied.

As can be seen from the above Table 5, in the experiments E1, E2, E5 to E14, E16 and E17, in which the criteria C1 to C3 are satisfied, the hot-press formed and cooled parts obtained from the welded blanks 1 have satisfying mechanical properties, in particular an ultimate tensile strength greater than or equal to that of the weakest substrate among the two substrates of the welded blank 1, after heat treatment, and a Charpy energy of the weld joint 22 at 20° C. greater than or equal to 25 J/cm².

Therefore, with the parts obtained from the blanks 1 according to the present disclosure, the presence of the weld joint 22 does not lower the properties of the welded steel part as compared to the properties of the weakest substrate 3 after hot-press forming and cooling.

Therefore, these parts will have a satisfactory crash performance, despite the presence of aluminum in the weld joint.

On the contrary, in the experiments E3, E4, E14, E15 and E18 to E20, which are not according to the present disclosure, since at least one among criteria C1 to C3 is not fulfilled, at least one of the ultimate tensile strength of the hot-press formed and cooled part or the Charpy energy of the weld joint is too low, and therefore not satisfactory. With these parts, there is, therefore, a risk that the part will fail in the weld joint in a crash situation, for example.

The method according to the present disclosure is therefore particularly advantageous, since it allows obtaining, after hot press-forming and cooling in the press tool, a part having excellent mechanical properties, including in the weld joint 22, despite the presence of aluminum in the weld joint.

It is therefore particularly well adapted for the fabrication of anti-intrusion parts, structural parts or energy-absorption parts that contribute to the safety of motor vehicles.

According to a particular embodiment of the method for producing the welded blank 1 according to the present disclosure, the step of producing the two precoated sheets 2 comprises:

providing two initial precoated sheets 2', arranging these two initial precoated sheets 2' adjacent to each other while leaving a predetermined gap therebetween; and simultaneously removing, through laser ablation, the precoating 5 on the two adjacent initial precoated sheets 2' over the removal fraction F so as to simultaneously create the removal zone 18 on adjacent faces of these two initial precoated sheets 2', the laser beam overlapping the two adjacent initial precoated sheets 2' during the removal step.

During the welding step, the thus prepared adjacent two precoated sheets 2 are welded with the laser beam spot overlapping the two precoated sheets 2. Preferably, the time between the end of the laser ablation and the beginning of the welding is less than or equal to 10 seconds.

Each intermediate zone 28 of the thus obtained welded blank 1 comprises solidification striations resulting from the laser ablation.

Due to the simultaneous removal of the precoating 5 over the removal fraction F using one laser beam overlapping both initial precoated sheets 2, the solidification striations on adjacent main faces 4 of the two precoated sheets 2 are symmetrical relative to a vertical median plane M between the two precoated sheets 2.

Furthermore, as mentioned previously with respect to FIG. 5, each intermediate zone 28 comprises an inner edge 30, located at the weld joint 22 and an outer edge 32, located away from the weld joint 22.

In this particular embodiment, due to the simultaneous ablation method, the distance between the outer edges of the adjacent intermediate zones of the two precoated sheets is substantially constant along the longitudinal direction of the weld joint 22. By substantially constant, it is meant that the distance between the outer edges 32 of the adjacent intermediate zones of the two precoated sheets 2 varies by at most 5% along the weld joint 22, i.e. in the longitudinal direction of the weld joint 22.

The present disclosure also relates to a part obtained by hot press-forming and cooling of the welded blank 1 obtained using the method according to the particular embodiment.

This hot press-formed and cooled part has the same features as mentioned above.

Furthermore, in this part, each intermediate zone comprises solidification striations, the solidification striations on adjacent main faces 4 of the two coated steel part portions being symmetrical relative to a vertical median plane between the two coated steel part portions.

Preferably, each intermediate zone comprises an inner edge, located at the weld joint 22 and an outer edge, located away from the weld joint 22 and the distance between the outer edges of the adjacent intermediate zones of the two coated steel part portions is substantially constant along the longitudinal direction of the weld joint 22. By substantially constant, it is meant that the distance between the outer edges of the adjacent intermediate zones of the two coated steel part portions varies by at most 5% along the weld joint 22, i.e. in the longitudinal direction of the weld joint 22.

What is claimed is:

1. A method for producing a welded steel blank comprising the successive steps of:

providing two precoated sheets, each precoated sheet comprising a steel substrate having a precoating on each of its two main faces, the precoating comprising an intermetallic alloy layer comprising at least iron and aluminum, each precoated sheet comprising, on each main face thereof, at a weld edge configured for being incorporated at least partially into a weld joint, a removal zone in which the precoating has been removed over a removal fraction comprised from 30% to 100% of a thickness of the precoating;

butt welding the precoated sheets using a filler wire so as to create the weld joint at a junction between the precoated sheets, the weld joint having a mean aluminum content $Al_{WJ}$ comprised between 0.1 wt. % and 1.2 wt. %, the composition of the filler wire and a proportion of filler wire added to the weld pool being such that the created weld joint is characterized by:

a quenching factor $FT_{WJ}$ of the weld joint such that $FT_{WJ}-0.96\times FT_{BM}\geq 0$, where:

$FT_{BM}$ is a quenching factor of a least hardenable steel substrate among the steel substrates of the two precoated sheets, and the quenching factors $FT_{WJ}$ and $FT_{BM}$ are determined using the following formula: $FT=128+1553\times C+55\times Mn+267\times Si+49\times Ni+5\times Cr-79\times Al-2\times Ni^2-1532\times C^2-5\times Mn^2-127\times Si^2-40\times C\times Ni-4\times Ni\times Mn$, where Al, Cr, Ni, C, Mn and Si are, respectively, a mean aluminum, chromium, nickel, carbon, manganese and silicon content, expressed in weight percent, of an area whose quenching factor is to be determined, the area being the weld joint in a case of $FT_{WJ}$ and the least hardenable steel substrate in the case of $FT_{BM}$, a mean nickel content $Ni_{WJ}$ of the weld joint fulfilling the following relationship: $Ni_{WJ}\leq 14-3.4\times Al_{WJ}$, where $Al_{WJ}$ is the mean aluminum content of the weld joint; and a mean chromium content $Cr_{WJ}$ of the weld joint fulfilling the following relationship: $Cr_{WJ}\leq 5-2\times Al_{WJ}$, where $Al_{WJ}$ is the mean aluminum content of the weld joint, wherein the welding is performed through laser welding, the laser welding not being a hybrid laser-arc welding.

2. The method according to claim 1, wherein the steel of the substrate of at least one of the precoated sheets comprises, by weight:

$0.10\%\leq C\leq 0.5\%$ $0.5\%\leq Mn\leq 4.5\%$ $0.1\%\leq Si\leq 1\%$ $0.01\%\leq Cr\leq 1\%$ $Ti\leq 0.2\%$ $Al\leq 0.1\%$ $S\leq 0.05\%$ $P\leq 0.1\%$ $B\leq 0.010\%$ a rest being iron and impurities resulting from manufacturing.

3. The method according to claim 1, wherein the mean aluminum content $Al_{WJ}$ of the weld joint is from 0.15 wt. % to 1.2 wt. %.

4. The method according to claim 1, wherein the mean aluminum content $Al_{WJ}$ of the weld joint is from 0.1 wt. % to 0.8 wt. %.

5. The method according to claim 1, wherein the mean nickel content $Ni_{WJ}$ of the weld joint is comprised between 0.1 wt. % and 13.6 wt.

6. The method according to claim 1, wherein the welded steel blank is such that, after hot press-forming and cooling:

a Charpy energy of the weld joint at 20° C. is greater than or equal to 25 $J/cm^2$; and an ultimate tensile strength of the hot press-formed and cooled steel welded steel blank is greater than or equal to an ultimate tensile strength of a weakest substrate among the substrates of the precoated sheets, the weakest substrate being the substrate for which a product of a thickness of the substrate and the ultimate tensile strength after hot press-forming and cooling of the substrate is the lowest.

7. The method according to claim 1, wherein the filler wire has a carbon content comprised between 0.01 wt. % and 0.45 wt. %.

8. The method according to claim 1, wherein, for at least one of the precoated sheets, the removal fraction is strictly smaller than 100% of the thickness of the precoating.

9. The method according to claim 8, wherein, for at least one of the precoated sheets, the precoating comprises a metallic alloy layer extending atop the intermetallic alloy layer, the metallic alloy layer being a layer of aluminum, a layer of aluminum alloy or a layer of aluminum-based alloy and wherein, for at least one of the precoated sheets, the metallic alloy layer has been removed over the entire thickness of the metallic alloy layer, while the intermetallic alloy layer remains integral in the removal zone on each main face of the precoated sheet.

10. The method according to claim 1, wherein, for at least one of the precoated sheets provided at the provision step, in the removal zone on each main face of the precoated sheet, the removal fraction is equal to 100% such that the precoating has been removed over its entire thickness.

11. The method according to claim 1, further comprising, prior to the providing step, a step of producing the two precoated sheets from respective initial precoated sheets, the producing step comprising a sub-step of obtaining the removal zone on each main face of each precoated sheet through removal of the precoating over a fraction removal fraction comprised from 30% to 100% of the thickness of the precoating through laser ablation at the weld edge of the precoated sheet.

12. The method according to claim 11, wherein the step of producing the two precoated sheets comprising:

providing two initial precoated sheets, arranging the two initial precoated sheets adjacent to each other while leaving a predetermined gap therebetween; and simultaneously removing, through laser ablation, the precoating on the two adjacent initial precoated sheets so as to simultaneously create the removal zone on adjacent faces of these two initial precoated sheets, the laser beam overlapping the two adjacent initial precoated sheets during the removal step.

13. The method according to claim 1, further comprising, prior to butt welding, preparing the weld edge of at least one of the precoated sheets, using at least one of the following processing steps: brushing, machining, chamfering and bevelling.

14. The method according to claim 1, wherein, for at least one of the precoated sheets, the steel of the substrate comprises, by weight:

$0.15\% \leq C \leq 0.25\%$
$0.8\% \leq Mn \leq 1.8\%$
$0.1\% \leq Si \leq 0.35\%$
$0.01\% \leq Cr \leq 0.5\%$
$Ti \leq 0.1\%$
$Al \leq 0.1\%$
$S \leq 0.05\%$
$P \leq 0.1\%$
$B \leq 0.005\%$ a rest being iron and impurities resulting from manufacturing.

15. The method according to claim 1, wherein, for one of the precoated sheets, the steel of the substrate comprises, by weight:

$0.040\% \leq C \leq 0.100\%$
$0.80\% \leq Mn \leq 2.00\%$
$Si \leq 0.30\%$
$S \leq 0.005\%$
$P \leq 0.030\%$
$0.010\% \leq Al \leq 0.070\%$
$0.015\% \leq Nb \leq 0.100\%$
$Ti \leq 0.080\%$
$N \leq 0.009\%$
$Cu \leq 0.100\%$
$Ni \leq 0.100\%$
$Cr \leq 0.100\%$
$Mo \leq 0.100\%$
$Ca \leq 0.006\%$, a rest being iron and impurities resulting from manufacturing.

16. The method according to claim 1, wherein the welding is performed using a protection gas.

17. A method for producing a welded and thereafter hot press-formed and cooled steel part comprising the successive steps of:

carrying out the method according to claim 1 in order to obtain the welded steel blank;

heating the welded steel blank so as to obtain a fully austenitic structure in the substrates of the precoated sheets;

hot press-forming the welded steel blank in a press tool to obtain a steel part; and cooling the steel part in the press tool.

18. The method according to claim 17, wherein, during the cooling step, the cooling rate is greater than or equal to a bainitic or martensitic cooling rate of a most hardenable among the substrates of the precoated sheets.

19. The method as recited in claim 1, wherein the substrate has a thickness between 1.0 and 3.0 mm.

20. The method according to claim 1, wherein the substrate has a thickness between 0.8 mm and 3.0 mm.

21. A welded steel blank comprising:

two precoated sheets, each precoated sheet comprising a steel substrate having a precoating on each of its main faces, the precoating comprising an intermetallic alloy layer comprising at least iron and aluminum, the precoated sheets being joined by a weld joint, the weld joint being obtained by laser welding, the laser welding not being a hybrid laser-arc welding, the weld joint having a mean aluminum content $Al_{WJ}$ comprised between 0.1 wt. % and 1.2 wt. %, and the weld joint being further characterized by:

a quenching factor $FT_{WJ}$ of the weld joint such that $FT_{WJ} - 0.96 \times FT_{BM} \geq 0$, where:

$FT_{BM}$ is a quenching factor of a least hardenable steel substrate among the steel substrates of the two precoated sheets, and the quenching factors $FT_{WJ}$ and $FT_{BM}$ are determined using the following formula: $FT = 128 + 1553 \times C + 55 \times Mn + 267 \times Si + 49 \times Ni + 5 \times Cr - 79 \times Al - 2 \times Ni^2 - 1532 \times C^2 - 5 \times Mn^2 - 127 \times Si^2 - 40 \times C \times Ni - 4 \times Ni \times Mn$, where Al, Cr, Ni, C, Mn and Si are, respectively, a mean aluminum, chromium, nickel, carbon, manganese and silicon content, expressed in weight percent, of an area whose quenching factor is to be determined, the area being the weld joint in the case of $FT_{WJ}$ and the least hardenable steel substrate in the case of $FT_{BM}$, a mean nickel content $Ni_{WJ}$ of the weld joint fulfilling the following relationship: $Ni_{WJ} \leq 14-3.4 \times Al_{WJ}$, where $Al_{WJ}$ is the mean aluminum content of the weld joint; and a mean chromium content $Cr_{WJ}$ of the weld joint fulfilling the following relationship: $Cr_{WJ} \leq 5-2 \times Al_{WJ}$, where $Al_{WJ}$ is the mean aluminum content of the weld joint, and each precoated sheet comprising, on each main face thereof, adjacent the weld joint, an intermediate zone in which the precoating has been removed over a removal fraction comprised from 30% to 100% of a thickness of the precoating.

22. The welded steel blank according to claim 21, wherein the steel of the substrate of at least one of the precoated sheets comprises, by weight:

$0.10\% \leq C \leq 0.5\%$ $0.5\% \leq Mn \leq 4.5\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ a rest being iron and impurities resulting from manufacturing.

23. The welded steel blank according to claim 21, wherein, for each precoated sheet, a width of the intermediate zone is comprised between 5 μm and 2000 μm from an edge of the weld joint.

24. The welded steel blank according to claim 21, wherein, for at least one of the precoated sheets, the removal fraction is equal to 100% of the thickness of the precoating.

25. The welded steel blank according to claim 21, wherein, for at least one of the precoated sheets, the removal fraction is strictly smaller than 100% of the thickness of the precoating.

26. The welded steel blank according to claim 25, wherein, for at least one precoated sheet, the precoating comprises a metallic alloy layer extending atop the intermetallic alloy layer, the metallic alloy layer being a layer of aluminum, a layer of aluminum alloy or a layer of aluminum-based alloy and wherein, for at least one of the precoated sheets, the metallic alloy layer has been removed over its entire thickness, while the intermetallic alloy layer remains integral in the removal zone on each main face of the precoated sheet.

27. The welded steel blank according to claim 21, wherein the nickel content $Ni_{WJ}$ of the weld joint is comprised between 0.1 wt. % and 13.6 wt. %.

28. The welded steel blank according to claim 21, wherein the nickel content $Ni_{WJ}$ of the weld joint is comprised between 0.2 wt. % and 12.0 wt. %.

29. The welded steel blank according to claim 21, wherein the welded steel blank is such that, after hot press-forming and cooling:

a Charpy energy of the weld joint at 20° C. is greater than or equal to 25 $J/cm^2$; and an ultimate tensile strength of the hot press-formed and cooled welded steel blank is greater than or equal to an ultimate tensile strength of a weakest substrate among the substrates of the precoated sheets, the weakest substrate being the substrate for which a product of a thickness of the substrate and the ultimate tensile strength after hot press-forming and cooling of the substrate is the lowest.

30. The welded steel blank according to claim 21, wherein the weld joint is such that, after hot press-forming and cooling, a maximum hardness variation ΔHV(WJ) across the weld joint is smaller than or equal to 20% of a mean hardness $HV_{mean}$(WJ) of the weld joint.

31. The welded steel blank according to claim 21, wherein each intermediate zone comprises solidification striations, the solidification striations on adjacent main faces of the two precoated sheets being symmetrical relative to a vertical median plane between the two precoated sheets.

32. The welded steel blank according to claim 21, wherein each intermediate zone comprises an inner edge located at the weld joint and an outer edge located away from the weld joint, wherein the distance between the outer edges of the adjacent intermediate zones of the two precoated sheets is constant along a longitudinal direction of the weld joint.

33. The welded steel blank as recited in claim 21, wherein the substrate has a thickness between 1.0 and 3.0 mm.

34. The welded steel blank according to claim 21, wherein the substrate has a thickness between 0.8 mm and 3.0 mm.

35. A welded, hot press-formed and cooled steel part comprising:

a first coated steel part portion; and a second coated steel part portion, each of the first and second coated steel part portions comprising a steel substrate having, on at least one of its main faces, a coating comprising at least iron and aluminum, the first and second coated steel part portions being joined by a weld joint, the weld joint being obtained by laser welding, the laser welding not being a hybrid laser-arc welding, the weld joint having a mean aluminum content $Al_{WJ}$ comprised between 0.1 wt. % and 1.2 wt. %, and the weld joint being further characterized by:

a quenching factor $FT_{WJ}$ of the weld joint that $FT_{WJ}-0.96 \times FT_{BM} \geq 0$, where:

$FT_{BM}$ is a quenching factor of a least hardenable steel substrate among the steel substrates of the first and second coated steel part portions, and the quenching factors $FT_{WJ}$ and $FT_{BM}$ are determined using the following formula: $FT=128+1553 \times C+55 \times Mn+267 \times Si+49 \times Ni+5 \times Cr-79 \times Al-2 \times Ni^2-1532 \times C^2-5 \times Mn^2-127 \times Si^2-40 \times C \times Ni-4 \times Ni \times Mn$, where Al, Cr, Ni, C, Mn and Si are, respectively, a mean aluminum, chromium, nickel, carbon, manganese and silicon content, expressed in weight percent, of an area whose quenching factor is to be determined, the area being the weld joint in the case of $FT_{WJ}$ and the least hardenable substrate in the case of $FT_{BM}$, a mean nickel content $Ni_{WJ}$ of the weld joint fulfilling the following relationship: $Ni_{WJ} \leq 14-3.4 \times Al_{WJ}$, where $Al_{WJ}$ is the mean aluminum content of the weld joint; and a mean chromium content $Cr_{WJ}$ of the weld joint fulfilling the following relationship: $Cr_{WJ} \leq 5-2 \times Al_{WJ}$, where $Al_{WJ}$ is the mean aluminum content of the weld joint, and each coated steel part portion comprising, on each main face thereof, adjacent the weld joint, an intermediate zone in which a thickness of the coating is strictly smaller than in adjacent zones of the coated steel part portion located at a greater distance from the weld joint than the intermediate zone or in which the coating is absent.

36. The welded, hot press-formed and cooled steel part according to claim 35, wherein the steel of the substrate of at least one of the first and second steel part portions comprising, by weight:

0.10%≤C≤0.5%

0.5%≤Mn 4.5%

0.1%≤Si≤1%

0.01%≤Cr≤1%

Ti≤0.2%

Al≤0.1%

S≤0.05%

P≤0.1%

B≤0.010% a rest being iron and impurities resulting from manufacturing.

37. The welded, hot press-formed and cooled steel part according to claim 36, wherein each intermediate zone comprises solidification striations, the solidification striations on adjacent main faces of the two coated steel part portions being symmetrical relative to a vertical median plane between the two coated steel part portions.

38. The welded, hot press-formed and cooled steel part according to claim 35, wherein each intermediate zone comprises an inner edge located at the weld joint and an outer edge located away from the weld joint, wherein a distance between the outer edges of the adjacent intermediate zones of the two coated steel part portions is constant along a longitudinal direction of the weld joint.

39. The welded, hot press-formed and cooled steel part according to claim 35, wherein a mean hardness $HV_{mean}$ (WJ) in the weld joint is smaller than or equal to 700 HV.

40. The welded, hot press-formed and cooled steel part according to claim 35, wherein the mean nickel content $Ni_{WJ}$ of the weld joint is comprised between 0.1 wt. % and 13.6 wt. %.

41. The welded, hot press-formed and cooled steel part according to claim 35, wherein the mean nickel content $Ni_{WJ}$ of the weld joint is comprised between 0.2 wt. % and 12.0 wt. %.

42. The welded, hot press-formed and cooled steel part according to claim 35, wherein:

a Charpy energy of the weld joint at 20° C. is greater than or equal to 25 J/cm$^2$; and an ultimate tensile strength of the welded, hot press-formed and cooled steel part is greater than or equal to an ultimate tensile strength of a weakest substrate among the substrates of the coated steel part portions, the weakest substrate being the substrate for which a product of a thickness of the substrate and the ultimate tensile strength of the substrate is the lowest.

43. The welded, hot press-formed and cooled steel part according to claim 35, wherein a maximum hardness variation ΔHV(WJ) across the weld joint is smaller than or equal to 20% of a mean hardness $HV_{mean}$(WJ) of the weld joint.

44. The welded, hot press-formed and cooled steel part according to claim 35, wherein, the steel of the substrate of at least one among the first and the second coated steel part portions comprises, by weight:

0.15%≤C≤0.25%

0.8%≤Mn≤1.8%

0.1%≤Si≤0.35%

0.01%≤Cr≤0.5%

Ti≤0.1%

Al≤0.1%

S≤0.05%

P≤0.1%

B≤0.005% a rest being iron and impurities resulting from manufacturing.

45. The welded, hot press-formed and cooled steel part according to claim 35, wherein the steel of the substrate of one among the first and the second coated steel part portions comprises, by weight:

0.040%≤C≤0.100%

0.80%≤Mn≤2.00%

Si≤0.30%

S≤0.005%

P≤0.030%

0.010%≤Al≤0.070%

0.015%≤Nb≤0.100%

Ti≤0.080%

N≤0.009%

Cu≤0.100%

Ni≤0.100%

Cr≤0.100%

Mo≤0.100%

Ca≤0.006%, a rest being iron and impurities resulting from manufacturing.

46. A method for producing an anti-intrusion part or an energy-absorption part for a motor vehicle comprising:

producing the anti-intrusion part or an energy-absorption part using the welded, hot press-formed and cooled steel part according to claim 35.

47. The welded, hot press-formed and cooled steel part as recited in claim 35, wherein the substrate has a thickness between 1.0 and 3.0 mm.

48. The welded, hot press-formed and cooled steel part according to claim 35, wherein the substrate has a thickness between 0.8 mm and 3.0 mm.

* * * * *